(12) United States Patent
Park et al.

(10) Patent No.: US 12,034,373 B2
(45) Date of Patent: Jul. 9, 2024

(54) ELECTRONIC DEVICES AND METHODS OF CONTROLLING POWER IN ELECTRONIC DEVICES

(71) Applicant: SAMSUNG ELECTRONICS CO., LTD., Suwon-si (KR)

(72) Inventors: Sangwook Park, Suwon-si (KR); Joonseok Park, Seoul (KR); Jongjin Lee, Suwon-si (KR); Horang Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 17/575,249

(22) Filed: Jan. 13, 2022

(65) Prior Publication Data

US 2022/0286054 A1 Sep. 8, 2022

(30) Foreign Application Priority Data

Mar. 4, 2021 (KR) .......................... 10-2021-0028728

(51) Int. Cl.
*H02M 3/158* (2006.01)
*G06F 13/42* (2006.01)
*H02M 3/157* (2006.01)

(52) U.S. Cl.
CPC ...... *H02M 3/1584* (2013.01); *G06F 13/4282* (2013.01); *H02M 3/157* (2013.01); *G06F 2213/0016* (2013.01); *G06F 2213/0038* (2013.01)

(58) Field of Classification Search
CPC . H02M 3/1584; H02M 3/157; G06F 13/4282; G06F 2213/0016; G06F 2213/0038
See application file for complete search history.

(56) References Cited

U.S. PATENT DOCUMENTS

| | | | |
|---|---|---|---|
| 5,530,635 A | 6/1996 | Yashiro | |
| 7,812,582 B2 * | 10/2010 | Chua-Eoan | ........... H02M 3/158 323/282 |
| 7,948,222 B2 | 5/2011 | Hardman et al. | |

(Continued)

FOREIGN PATENT DOCUMENTS

| | | |
|---|---|---|
| JP | 2015-192511 A | 11/2015 |
| JP | 6247142 B2 | 12/2017 |

*Primary Examiner* — Nimesh G Patel
(74) *Attorney, Agent, or Firm* — Sughrue Mion, PLLC

(57) ABSTRACT

An electronic device includes a system on chip (SoC) and a power management integrated circuit (PMIC). The SoC includes a plurality of power domains and a dynamic voltage and frequency scaling (DVFS) controller which performs DVFS on the power domains The PMIC includes direct current (DC)-DC converters and a control logic which controls the plurality of DC-DC converters, and each of the DC-DC converters provides a corresponding output voltage to a respective one of the power domains. The control logic designates a target DC-DC converter which provides a target output voltage having a target level as a global DC-DC converter and provides the target output voltage to a power domain corresponding the global DC-DC converter and to at least one first power domain consuming the target output voltage, from among the plurality of power domains, by sharing the target output voltage provided by the global DC-DC converter.

20 Claims, 19 Drawing Sheets

(56) References Cited

U.S. PATENT DOCUMENTS

| | | |
|---|---|---|
| 2007/0210775 A1 | 9/2007 | Bothra et al. |
| 2013/0043727 A1 | 2/2013 | Liu et al. |
| 2015/0303808 A1* | 10/2015 | Ryotaro .............. H02M 3/1588 |
| | | 323/271 |
| 2017/0331371 A1* | 11/2017 | Parto .......................... G06F 1/26 |
| 2022/0179437 A1* | 6/2022 | Lee ......................... H02M 3/04 |
| 2023/0065469 A1* | 3/2023 | Zou ......................... H02M 1/08 |

* cited by examiner

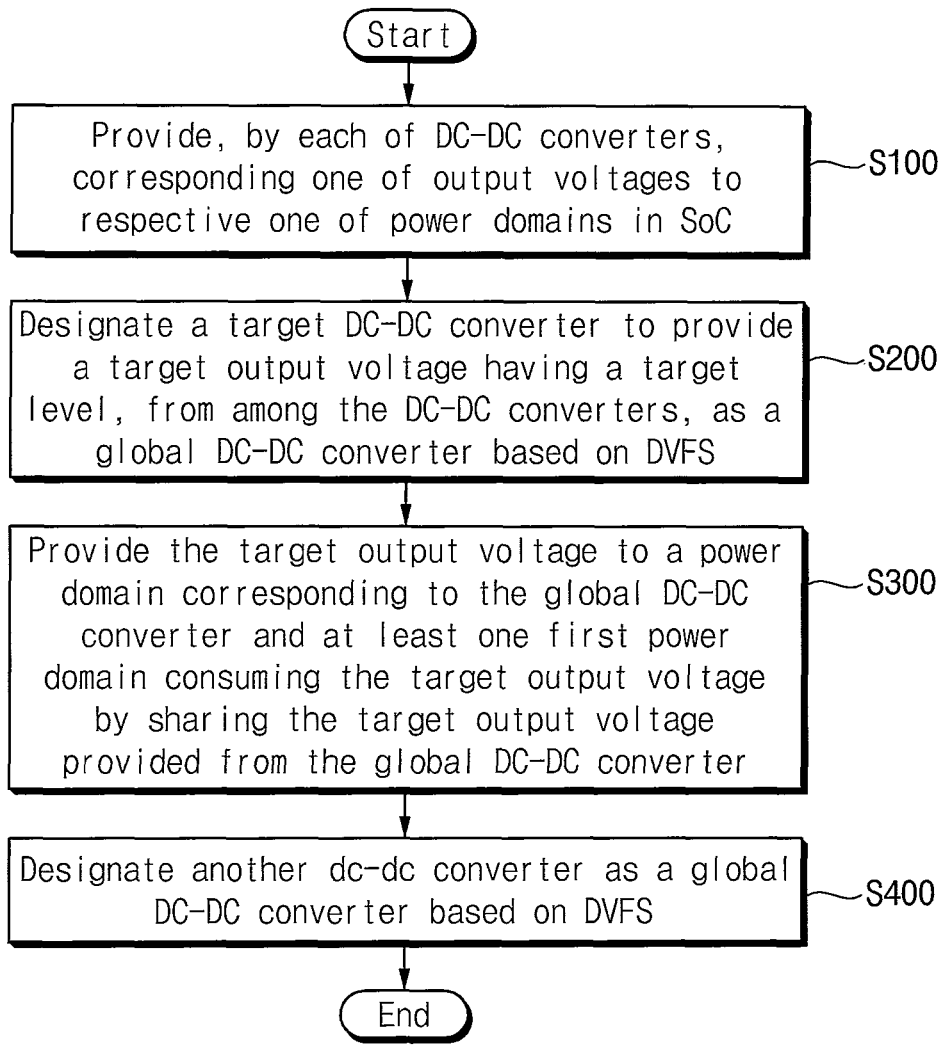

Share the target output voltage by controlling multiplexers disposed between a PMIC and the SoC — S310b

Share the target output voltage by controlling multiplexers disposed inside of the SoC — S310c

ELECTRONIC DEVICES AND METHODS OF CONTROLLING POWER IN ELECTRONIC DEVICES

CROSS-REFERENCE TO RELATED APPLICATIONS

This application claims priority under 35 U.S.C. § 119 to Korean Patent Application No. 10-2021-0028728, filed on Mar. 4, 2021 in the Korean Intellectual Property Office, the disclosure of which is incorporated by reference herein in its entirety.

TECHNICAL FIELD

Example embodiments relate to power management, and more particularly, to electronic devices and methods of controlling power in electronic devices.

DISCUSSION OF RELATED ART

A system-on-chip (SoC) is a technology in which all of the sub-systems of a computer or like electronic system are provided as an integrated circuit (IC) on a single die, i.e., a single chip contains all of the subsystems of a computer or like electronic system. The SoC operates based on a power from a power management integrated circuit (PMIC) and the PMIC includes a plurality of converters and each of the plurality of converters provides a power to corresponding one of a plurality of power domains for increasing efficiency.

SUMMARY

One or more example embodiments provide an electronic device, capable of increasing power efficiency of a PMIC including a plurality of converters to provide respective power to a corresponding one of a plurality of power domains.

One or more example embodiments also provide a method of controlling power in an electronic device, capable of increasing power efficiency of a PMIC including a plurality of converters to provide respective power to a corresponding one of a plurality of power domains.

According to an aspect of an example embodiment, there is provided an electronic device including: a system-on chip (SoC) including a plurality of power domains and a dynamic voltage and frequency scaling (DVFS) controller configured to perform DVFS on the plurality of power domains, each of the plurality of power domains including at least one function block; and a power management integrated circuit (PMIC) including a plurality of direct current (DC)-DC converters and a control logic configured to control the plurality of DC-DC converters, each of the plurality of DC-DC converters configured to provide a corresponding one of a plurality of output voltages to a respective one of the plurality of power domains, wherein the control logic is configured to: designate a target DC-DC converter configured to provide a target output voltage having a target level, from among the plurality of DC-DC converters, as a global DC-DC converter based on a power management control signal associated with the DVFS; and provide the target output voltage to a power domain corresponding to the global DC-DC converter and to at least one first power domain consuming the target output voltage, from among the plurality of power domains, by sharing the target output voltage provided by the global DC-DC converter.

According to an aspect of an example embodiment, there is provided a method of controlling power in an electronic device, wherein the electronic device includes a system on chip (SoC) including a plurality of power domains and a dynamic voltage and frequency scaling (DVFS) controller configured to perform DVFS on the plurality of power domains, each of the plurality of power domains including at least one function block, and a power management integrated circuit (PMIC) including a plurality of direct current (DC)-DC converters, the method including: providing, by each of the plurality of DC-DC converters, a corresponding one of a plurality of output voltages to respective one of the plurality of power domains; designating a target DC-DC converter configured to provide a target output voltage having a target level, from among the plurality of DC-DC converters, as a global DC-DC converter based on the DVFS; and providing the target output voltage to a power domain corresponding to the global DC-DC converter and at least one first power domain consuming the target output voltage, from among the plurality of power domains, by sharing the target output voltage provided by the global DC-DC converter.

According to an aspect of an example embodiment, there is provided an electronic device including: a system on chip (SoC) including a plurality of power domains and a dynamic voltage and frequency scaling (DVFS) controller configured to perform DVFS on the plurality of power domains, each of the plurality of power domains including at least one function block; a power management integrated circuit (PMIC) including a plurality of direct current (DC)-DC converters and a control logic configured to control the plurality of DC-DC converters, each of the plurality of DC-DC converters configured to provide corresponding one of a plurality of output voltages to respective one of the plurality of power domains; a plurality of inductors, each of the plurality of inductors being connected between respective one of a plurality of output nodes and respective one of a plurality of switching terminals connected to respective switching node of respective one of the plurality of DC-DC converters, respective one of the plurality of output voltages being provided at respective one of the plurality of output nodes; a plurality of output capacitors, each coupled between respective one of the plurality of output nodes and a ground voltage; a plurality of first connection switches, each connected between each of a plurality of switching nodes and respective one of the plurality of switching terminals; a plurality of second connection switches, each connected between each of a plurality of feedback nodes and respective one of the plurality of DC-DC converters, each of the plurality of feedback nodes being connected to respective one of a plurality of feedback lines connected to the plurality of output nodes; and a plurality of merging switches configured to connect two different feedback lines among the plurality of feedback lines, wherein the control logic is configured to: designate a target DC-DC converter configured to provide a target output voltage having a target level among the plurality of DC-DC converters as a global DC-DC converter based on a power management control signal associated with the DVFS, and provide the target output voltage to a power domain corresponding the global DC-DC converter and to at least one first power domain consuming the target output voltage among the plurality of power domains by controlling the plurality of first connection switches, the plurality of second connection switches and the plurality of merging switches to share the target output voltage provided by the global DC-DC converter.

BRIEF DESCRIPTION OF THE DRAWINGS

The above and other aspects of the present disclosure will become more apparent by describing in detail example embodiments thereof with reference to the accompanying drawings.

FIG. 14 is a flow chart illustrating a method of controlling power in an electronic device according to example embodiments;

FIG. 15 is a flow chart illustrating an example of sharing an output voltage from the global DC-DC converter in FIG. 14 according to example embodiments;

FIG. 16 is a flow chart illustrating an example of sharing an output voltage from the global DC-DC converter in FIG. 14 according to example embodiments;

FIG. 17 is a flow chart illustrating an example of sharing an output voltage from the global DC-DC converter in FIG. 14 according to example embodiments;

DETAILED DESCRIPTION

Figure 1:
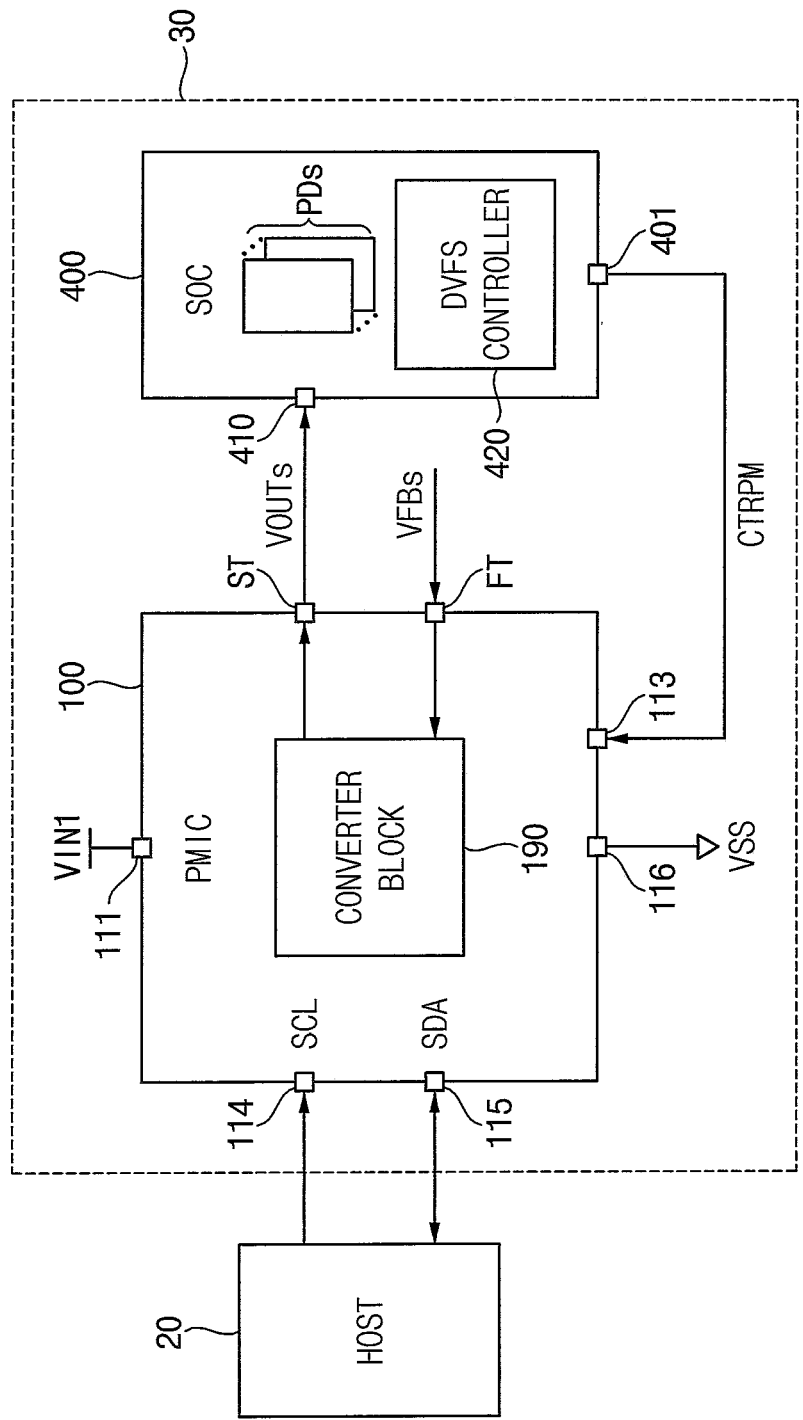
FIG. 1 is a block diagram illustrating a computing system according to example embodiments.

Example embodiments of the present disclosure will be described more fully hereinafter with reference to the accompanying drawings. Like reference numerals may refer to like elements throughout the accompanying drawings.

FIG. 1 is a block diagram illustrating a computing system according to example embodiments.

Referring to FIG. 1, a computing system 10 may be implemented with any computing device or any mobile/portable device, such as a mobile phone, a smart phone, a tablet computer, a laptop computer, a personal digital assistants (PDA), an enterprise digital assistant (EDA), a portable multimedia player (PMP), a digital camera, a portable game console, a music player, a camcorder, a video player, a navigation device, a wearable device, an internet of things (IoT) device, an internet of everything (IoE) device, an e-book, a virtual reality (VR) device, an augmented reality (AR) device, a robotic device, etc.

The computing system 10 may include a host 20 and an electronic device 30 and the electronic device 30 may include a power management integrated circuit (PMIC) 100 and a system-on chip (SoC) 400.

The host 20 may be a master device that may communicate with the PMIC 100. For example, the host 20 may drive a serial clock line SCL and a serial data line SDA between the host 20 and the PMIC 100 in compliance with a given communication protocol, such as a serial peripheral interface (SPI) protocol, an inter-integrated circuit (I2C) protocol, or an I3C protocol. The host 20 may transmit an SCL signal (clock signal) to the PMIC 100 through the SCL and may transmit an SDA signal (data signal) synchronized with the SCL signal to the PMIC 100 through the SDA.

The host 20 may initiate communication by driving the SCL to a first logical state (e.g., logic high) and driving the SDA from the first logical state to a second logical state (e.g., logic low). The host 20 may transmit the SDA signal including address bits of the PMIC 100 and an R/W bit indicating a read operation or a write operation, to the PMIC 100. The host 20 may receive the SDA signal including an acknowledge (ACK) bit from the PMIC 100. The host 20 may check (or determine) whether the address bits and the R/W bit are successfully transmitted to the PMIC 100, by using the ACK bit.

The PMIC 100 may be a slave device that may communicate with the host 20. The PMIC 100 may include an SCL terminal 114 that is connected to the SCL and receives the SCL signal and an SDA terminal 115 that is connected to the SDA and receives the SDA signal or outputs the SDA signal.

The PMIC 100 may include an input voltage terminal 111 receiving an input voltage VIN1, a ground voltage terminal 116 receiving a ground voltage VSS, a switching terminal ST providing output voltages VOUTs and a feedback terminal FT receiving feedback voltages VFBs. The PMIC 100 may include a terminal 113 to receive a power management control signal CTRPM from the SoC 400 and the SoC may provide the power management control signal CTRPM to the PMIC 100 via a terminal 401.

The PMIC 100 may further include a converter block 190 that generates the output voltages VOUTs based on the input voltage VIN1 and provides the output voltages VOUTs to power domains PDs of the SoC 400. The converter block 190 may include a plurality of DC-DC converters and each of the plurality of DC-DC converters may generate corresponding one of the output voltages VOUTs. The PMIC 100 may provide the output voltages VOUTs to the power domains PDs via voltage terminals 410 of the SoC 400.

The feedback voltage VFBs may be voltages corresponding to the output voltages VOUTs that are fed back to the PMIC 100 after the output voltages VOUTs are supplied to the SoC 400. For example, the output voltages VOUTs may be directly provided to the PMIC 100, and each level of the feedback voltage VFBs may be the same as a level of corresponding one of the output voltages VOUTs.

On the other hand, the output voltages VOUTs may be indirectly provided to the PMIC 100. For example, the output voltages VOUTs may be provided to the PMIC 100 through a voltage divider or a filter circuit including passive components (e.g., a resistor, a capacitor, an inductor, and so on.). In this case, the voltage divider or the filter circuit may be placed on a substrate on which the PMIC 100 and the SoC 400 are mounted. In this case, each level of the feedback voltages VFBs may be different from as a level of corresponding one of output voltages VOUTs.

Figure 2A:
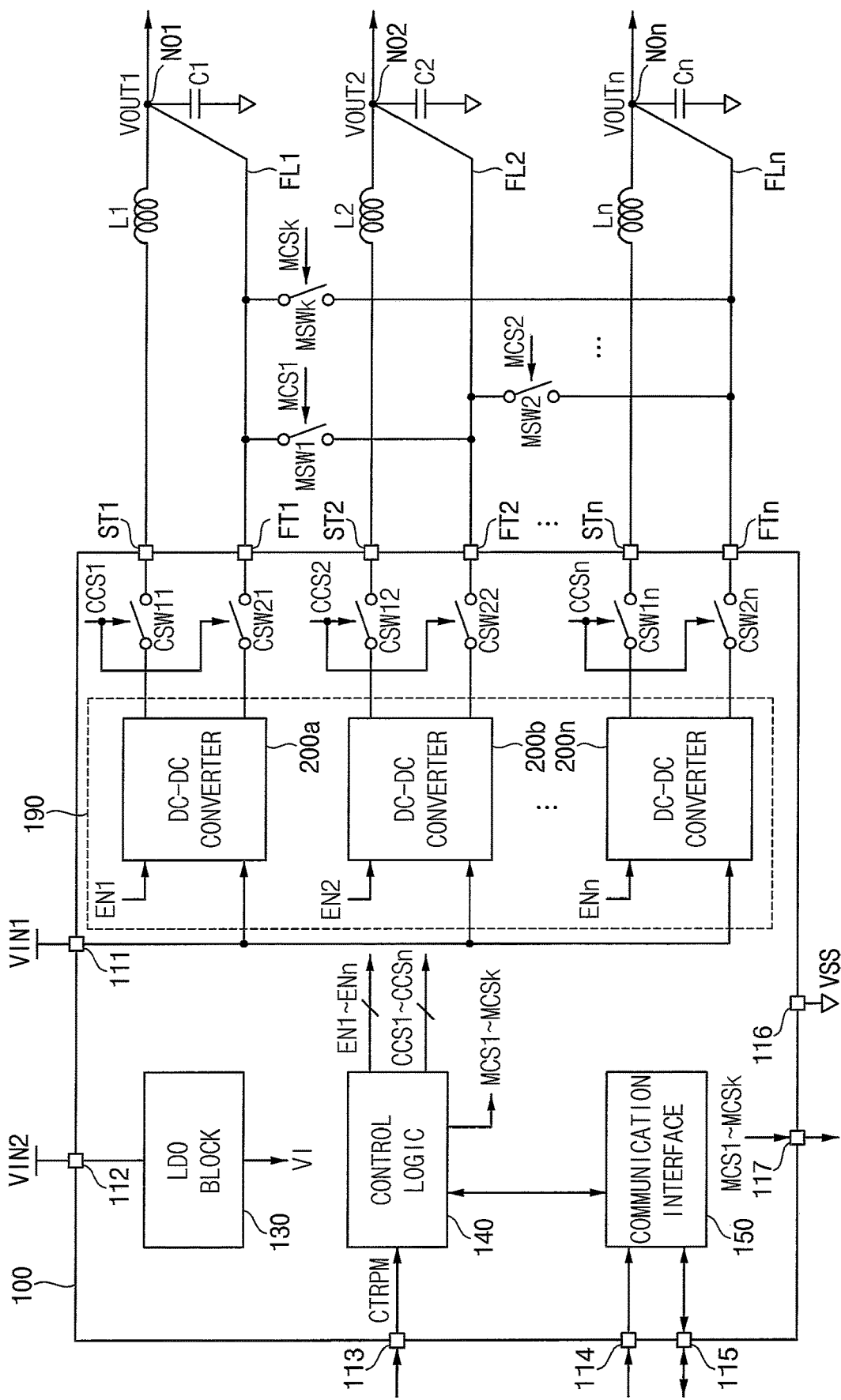
FIG. 2A illustrates the PMIC and component associated with the PMIC in computing system of FIG. 1 according to example embodiments.

FIG. 2A illustrates the PMIC and component associated with the PMIC in computing system of FIG. 1 according to example embodiments.

Referring to FIGS. 1 and 2A, the PMIC 100 may include input voltage terminals 111 and 112, switching terminals ST1~STn, feedback terminals FT1~FTn, a ground voltage terminal 116, general purpose input/output (GPIO) terminals 113 and 117, an SCL terminal 114, an SDA terminal 115, a low drop-out (LDO) block 130, a control logic 140, a communication interface 150 and the converter block 190.

The converter block 190 may include a plurality of DC-DC converters 200a~200n. The PMIC 100 may further include a plurality of first connection switches CSW11~CSW1n and a plurality of second connection switches CSW21~CSW2n. Here, n is an integer greater than two.

The LDO block 130 may include a LDO regulator, may receive a second input voltage VIN2, may generate an internal voltage VI based on the second input voltage VIN2 and may provide the internal voltage VI to the control logic 140 and the communication interface 150. The control logic 140 and the communication interface 150 may operate based on the internal voltage VI.

Each of the plurality of DC-DC converters 200a~200n may be connected to respective one of the switching terminals ST1~STn via respective one of the plurality of first connection switches CSW11~CSW1n and may provide respective one of the plurality of output voltages VOUT1~VOUTn to respective one of the output nodes NO1~NOn via respective one of the switching terminals ST1~STn.

Each of the plurality of DC-DC converters 200a~200n may be connected to respective one of the feedback terminals FT1~FTn via respective one of the plurality of second connection switches CSW21~CSW2n, and may be fed back with respective one of the plurality of output voltages VOUT1~VOUTn through respective one of the feedback lines FL1~FLn connected to the feedback terminals FT1~FTn, respectively.

The electronic device 30 in FIG. 1 may further include inductors L1~Ln and output capacitors C1~Cn. Each of the inductors L1~L1n may be coupled between respective one of the switching terminals ST1~STn and respective one of the output nodes NO1~NOn. Each of the output capacitors C1~Cn may be coupled between respective one of the output nodes NO1~NOn and the ground voltage VSS.

The electronic device 30 in FIG. 1 may further include a plurality of merging switches MSW1~MSWk and each of the merging switches MSW1~MSWk may connect two different feedback lines with respect to each other from among the plurality of feedback terminals FT1~FTn. Here, k correspond to n*(n−1)/2.

The control logic 140 may receive the power management control signal CTRPM from the SoC 400 through the GPIO terminal 113 and may control each of the DC-DC converters 200a~200k based on the power management control signal CTRPM. That is, the control logic 140 may control merging and separation (activation and deactivation) of the DC-DC converters 200a~200k based on the power management control signal CTRPM.

The control logic 140 may designate a target DC-DC converter which provides an output voltage (i.e., a target output voltage) having a target voltage level corresponding to a smallest voltage level, from among the DC-DC converters 200a~200k, as a global DC-DC converter based on the power management control signal CTRPM. The control logic 140 may provide the target output voltage to a power domain corresponding the global DC-DC converter and to at least one first power domain consuming the target output voltage, from among the plurality of power domains, by controlling the on state or the off state of the first connection switches CSW11~CSW1n, the second connection switches CSW21~CSW2n and the merging switches MSW1~MSWk such that the target output voltage provided from the global DC-DC converter is shared with the at least one first power domain consuming the target output voltage except the global DC-DC converter, from among the DC-DC converters 200a~200k.

The control logic 140 may disable the at least one DC-DC converter generating the target output voltage and may enhance efficiency of the PMIC 100 when at least two of the DC-DC converters 200a~200k generate the target output voltage.

The control logic 140 may generate a plurality of enable signals EN1~ENn based on the power management control signal CTRPM, and may provide each of the enable signals EN1~ENn to respective one of the DC-DC converters 200a~200k to control activation and deactivation of each of the DC-DC converters 200a~200k, respectively.

The control logic 140 may generate a plurality of connection control signals CCS1~CCSn based on the power management control signal CTRPM and may provide the connection control signals CCS1~CCSn to the first connection switches CSW11~CSW1n and the second connection switches CSW21~CSW2n to controlling the on state or the off state of the first connection switches CSW11~CSW1n and the second connection switches CSW21~CSW2n. The first connection switches CSW11~CSW1n and the second connection switches CSW21~CSW2n are turned on or turned off by one pair. When a corresponding pair of the first connection switches CSW11~CSW1n and the second connection switches CSW21~CSW2n are turned off, the corresponding pair may prevent a current due to the shared target output voltage from flowing into a corresponding DC-DC converter.

The control logic 140 may generate a plurality of merging control signals MCS1~MCSk based on the power management control signal CTRPM and may provide the merging control signals MCS1~MCSk to the merging switches MSW1~MSWk via the GPIO terminal 117 to controlling the on state or the off state of the merging switches MSW1~MSWk. For example, the merging switch MSW1 may selectively connect the feedback line FL1 of the DC-DC converter 200a with the feedback line FL2 of the DC-DC converter 200b in response to the merging control signal MCS1. The merging switch MSW2 may selectively connect the feedback line FL2 of the DC-DC converter 200b with the feedback line FLn of the DC-DC converter 200n in response to the merging control signal MCS2. The merging switch MSWk may selectively connect the feedback line FL1 of the DC-DC converter 200a with the feedback line FLn of the DC-DC converter 200n in response to the merging control signal MCSk.

The control logic 140 may turn on the merging switch to connect a feedback line of the global DC-DC converter with a feedback line of the at least one first DC-DC converter sharing the target output voltage and may turn off the merging switches to connect the feedback line of the global DC-DC converter with the feedback lines of the DC-DC converters not sharing the target output voltage.

The communication interface 150 may be connected to the host 20 through the SCL terminal 114 and the SDA terminal 115, may exchange data with the host 20 and may exchange signals with the control logic 140.

Figure 2B:
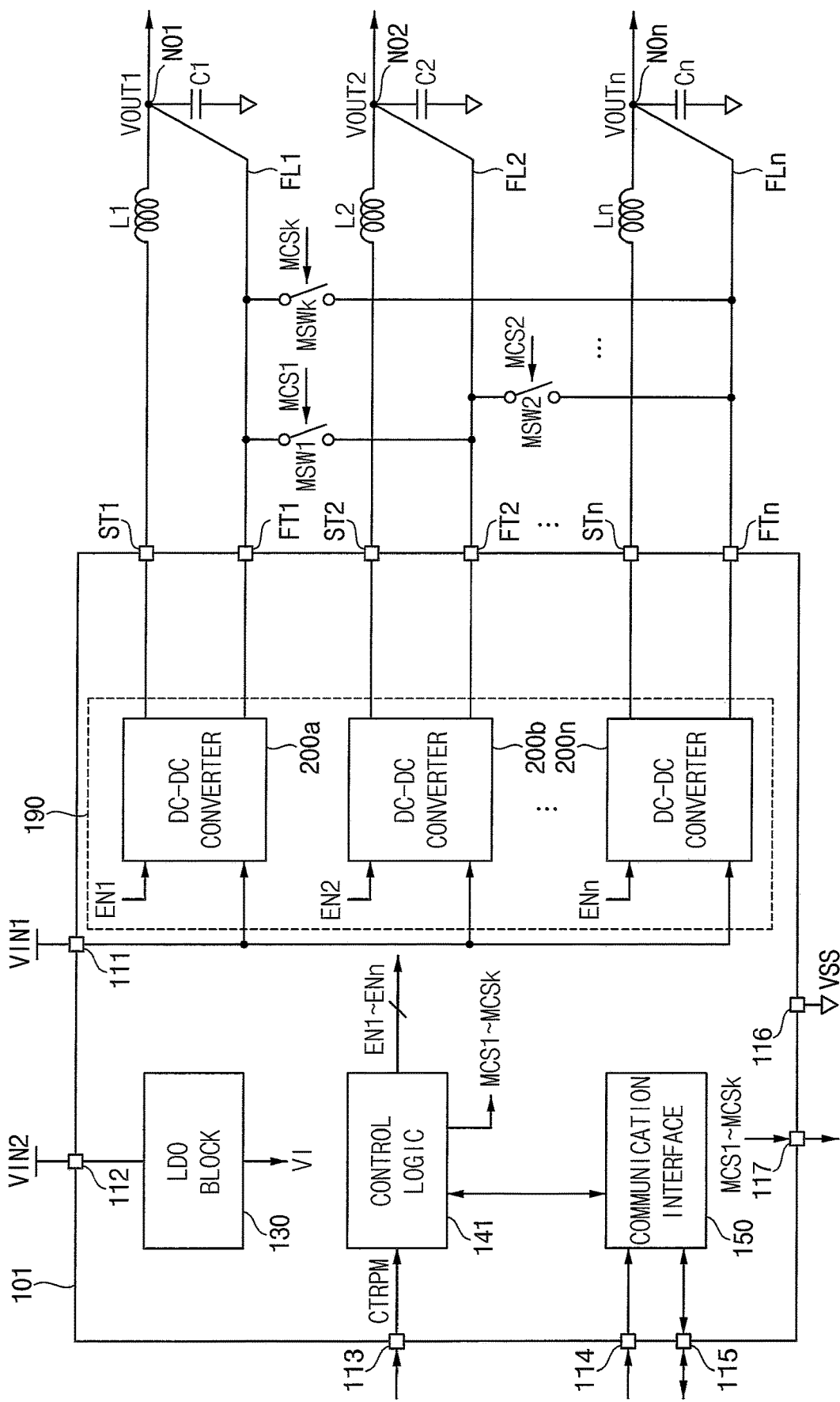
FIG. 2B illustrates a PMIC and component associated with the PMIC in computing system of FIG. 1 according to example embodiments.

FIG. 2B illustrates a PMIC and component associated with the PMIC in computing system of FIG. 1 according to example embodiments.

Referring to FIGS. 1 and 2B, a PMIC 101 may include input voltage terminals 111 and 112, switching terminals ST1~STn, feedback terminals FT1~FTn, a ground voltage terminal 116, GPIO terminals 113 and 117, an SCL terminal 114, an SDA terminal 115, a low drop-out (LDO) block 130, a control logic 140, a communication interface 150 and the converter block 190.

The PMIC 101 in FIG. 2B differs from the PMIC 100 in FIG. 2A in that the PMIC 101 does not include first connection switches CSW11~CSW1n and second connection switches CSW21~CSW2n and each of the plurality of DC-DC converters 200a~200n may be connected to respective one of the switching terminals ST1~STn and respective one of the feedback terminals FT1~FTn.

Each of the plurality of DC-DC converters 200a~200n may provide respective one of the plurality of output voltages VOUT1~VOUTn to respective one of the output nodes NO1~NOn via respective one of the switching terminals ST1~STn and may be fed back with respective one of the plurality of output voltages VOUT1~VOUTn through respective one of the feedback lines FL1~FLn connected to the feedback terminals FT1~FTn, respectively.

The control logic 140 may receive the power management control signal CTRPM from the SoC 400 through the GPIO terminal 113 and may control each of the DC-DC converters 200a~200k based on the power management control signal CTRPM. That is, the control logic 140 may control merging and separation (activation and deactivation) of the DC-DC converters 200a~200k based on the power management control signal CTRPM.

The control logic 140 may designate a target DC-DC converter which provides an output voltage (i.e., a target output voltage) having a target voltage level corresponding to a smallest voltage level, from among the DC-DC converters 200a~200k, as a global DC-DC converter based on the power management control signal CTRPM. The control logic 140 may provide the target output voltage to a power domain corresponding the global DC-DC converter and to at least one first power domain consuming the target output voltage, from among the plurality of power domains, by controlling the on state or the off state of the merging switches MSW1~MSWk such that the target output voltage provided from the global DC-DC converter is shared with the at least one first power domain consuming the target output voltage except the global DC-DC converter, from among the DC-DC converters 200a~200k.

The control logic 140 may disable the at least one DC-DC converter generating the target output voltage and may enhance efficiency of the PMIC 100 when at least two of the DC-DC converters 200a~200k generate the target output voltage.

The control logic 140 may generate a plurality of enable signals EN1~ENn based on the power management control signal CTRPM, and may provide each of the enable signals EN1~ENn to respective one of the DC-DC converters 200a~200k to control activation and deactivation of each of the DC-DC converters 200a~200k, respectively.

The control logic 140 may generate a plurality of merging control signals MCS1~MCSk based on the power management control signal CTRPM and may provide the merging control signals MCS1~MCSk to the merging switches MSW1~MSWk via the GPIO terminal 117 to controlling the on state or the off state of the merging switches MSW1~MSW.

Figure 3:
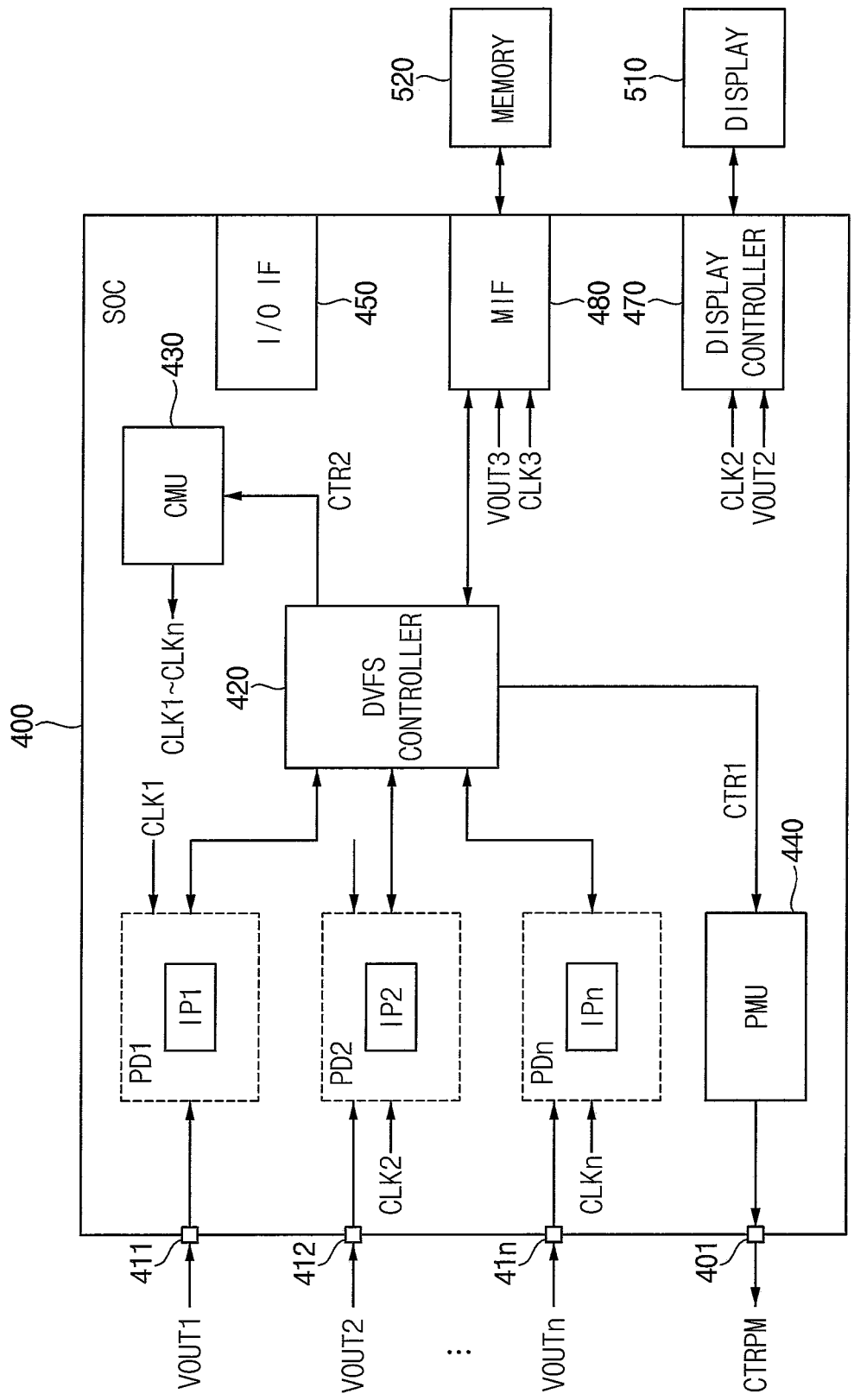
FIG. 3 is a block diagram illustrating an example of an SoC in the electronic device in FIG. 1 according to example embodiments.

FIG. 3 is a block diagram illustrating an example of an SoC in the electronic device in FIG. 1 according to example embodiments.

Referring to FIGS. 1 and 3, the SoC 400 may include voltage terminals 411~41n, a GPIO terminal 401, a plurality of function blocks IP1~IPn and a dynamic voltage and frequency scaling (DVFS) controller 420. In example embodiments, the SoC 400 may further include a clock management unit (CMU) 430, a power management unit (PMU) 440, a memory interface (MIF) 480, an I/O interface (I/O IF) 450 and a display controller 470.

In example embodiments, the SoC 400 may be an application processor (AP), a mobile AP, or the like.

The memory interface 480 may be connected to an external memory 520 and the display controller 470 may be connected to an external display 510.

Each of the plurality of function blocks IP1~IPn may belong to respective one of different power domains PD1~PDn. One or more function blocks may belong to each of the power domains PD1~PDn.

Each of the output voltages VOUT1~VOUTn may be supplied to respective one of the power domains PD1~PDn through respective one of the voltage terminals 411~41n and each of clock signals CLK1~CLKn may be provided to respective one of the power domains PD1~PDn from the CMU 430. Each of the function blocks IP1~IPn belonging to respective one of the power domains PD1~PDn may operate based on respective one of the output voltages VOUT1~VOUTn and respective one of the clock signals CLK1~CLKn.

The DVFS controller 420 may perform DVFS on the power domains PD1~PDn by adjusting a frequency of each of the clock signals CLK1~CLKn and/or a voltage level of each of the output voltages VOUT1~VOUTn. The DVFS technology represents a technology that dynamically controls or adjusts an operating frequency and an operating voltage of the SoC 400 to reduce power consumption.

The CMU 430 may generate the clock signals CLK1~CLK4 and may increase, maintain or decrease the frequency of each of the clock signals CLK1~CLK4 based on a clock control signal CTR2 from the DVFS controller 420.

The PMU 440 may monitor the current power consumption of the SoC 400, may store the permitted power consumption of the SoC 400, and may compare the current power consumption with the permitted power consumption. The PMU 440 may generate the power control management control signal CTRPM for controlling the PMIC 200 based on a power control signal CTR1 and/or a result of the comparing operation, and may provide the power control management control signal CTRPM to the PMIC 100 through the GPIO terminal 401.

The memory interface 480 may control or facilitate data transfer between the SoC 400 and the memory device 520.

For example, the memory interface 480 may operate based on the clock signal CLK3 and the output voltage VOUT3. The memory interface 480 may belong to the third power domain.

The memory device 520 may be disposed outside the SoC 400 and may exchange data with the SoC 400 via the memory interface 480. In example embodiments, the memory device 520 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. Alternatively, the memory device 520 may include a solid state drive or solid state disk (SSD), an embedded SSD (eSSD), a multimedia card (MMC), an embedded MMC (eMMC), a universal flash storage (UFS), etc.

The I/O interface 450 may control or facilitate data transfer between the SoC 400 and an external system. In example embodiments, the I/O interface 450 may support a serial advanced technology attachment (SATA), a SATA express (SATAe), a SAS (serial attached small computer system interface (SCSI)), a peripheral component interconnect-express (PCIe®), a nonvolatile memory express (NVMe), or a mobile industry processor interface (MIPI®).

The display controller 470 may control or facilitate data transfer between the SoC 400 and the display 510. The display 510 may be disposed outside the SoC 400 and may display image data form the SoC 400. For example, the display 510 may operate based on the clock signal CLK2 and the output voltage VOUT2. The display controller 470 may belong to the second power domain.

In example embodiments, at least a part of the DVFS controller 420, the CMU 430 and the PMU 440 may be implemented as hardware. For example, at least a part of the DVFS controller 420, the CMU 430 and the PMU 440 may be implemented as instructions or program routines (e.g., a software program). For example, the instructions or the program routines may be stored in an internal storage included in the SoC 400 or the memory device 520 located at outside of the SoC 400.

The SoC 400 may include a performance monitoring unit that measures or counts performance parameters of the function blocks IP1~IPn, the memory interface 480 and the display controller 470. For example, the performance parameters may include instruction cycles, workloads, cache hits, cache misses, branch misses, etc. The DVFS controller 520 may control the DVFS based on measuring result of the performance monitoring unit.

Figure 4:
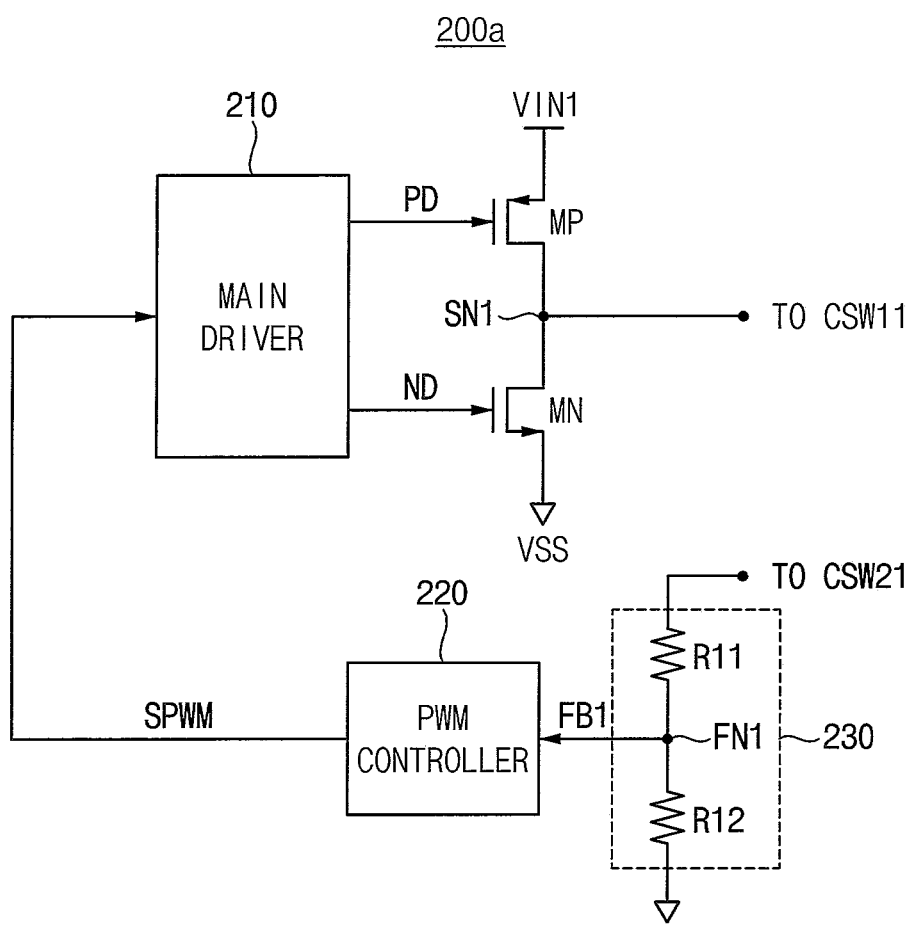
FIG. 4 is a block diagram illustrating one of the DC-DC converters in the PMIC in FIG. 2A or 2B according to example embodiments.

FIG. 4 is a block diagram illustrating one of the DC-DC converters in the PMIC in FIG. 2A or 2B according to example embodiments.

FIG. 4 illustrates a configuration of the DC-DC converter 200a and each configuration of the DC-DC converters 200b~200n may be substantially the same as the configuration of the DC-DC converter 200a.

Referring to FIG. 4, the DC-DC converter 200a may include a main driver 210, a first power switch MP, a second power switch MN, a feedback circuit 230 and a pulse width modulation (PWM) controller 220.

The first power switch MP may be coupled between the input voltage VIN1 and a switching node SN1 connected to the first connection switch CSW11 and may include a PMOS transistor that has a source coupled to the input voltage VIN1, a gate receiving a first driving control signal PD and a drain coupled to the switching node SN1. The second power switch MN may be coupled between the switching node SN1 and a ground voltage VSS. The second power switch MP may include an NMOS transistor which has a drain coupled to the switching node SN, a gate receiving a second driving control signal ND and a source coupled to the ground voltage VSS.

The PWM controller 220 may generate a PWM signal SPWM based on a feedback voltage FB1 which is proportional to the output voltage VOUT1. The PWM controller 220 may generate the PWM signal SPWM by performing a PWM on the feedback voltage FB1.

The feedback circuit 230 may generate the feedback voltage FB1 which is proportional to the output voltage VOUT1 and may provide the feedback voltage FB1 to the PWM controller 220. The feedback circuit 230 may include dividing resistors R11 and R12 connected between the second connection switch CSW21 and the ground voltage VSS and the dividing resistors R11 and R12 may be connected to each other at a feedback node FN1.

For example, as illustrated in FIG. 4, the feedback circuit 230 may generate the feedback voltage FB1 corresponding to a ratio of resistance values of the dividing resistors R11 and R12, but example embodiments are not limited thereto.

As illustrated in FIG. 4, each of the DC-DC converters 200a~200n may include a buck converter. The buck converter may receive the input voltage VIN1 and may generate an output voltage whose level is relatively smaller than the level of the input voltage VIN1, based on the input voltage VIN1. Therefore, when each of the DC-DC converters 200a~200n may generate an output voltage whose voltage level is smallest from among voltage levels which each of the DC-DC converters 200a~200n is capable of generating, efficiency of the PMIC may be low.

However, the PMIC 100 or 101 according to example embodiments, enables one of the DC-DC converters which generate the target output voltage corresponding to the smallest voltage level from among voltage levels which each of the DC-DC converters 200a~200n is capable of generating, and the enabled DC-DC converter provides the target output voltage to corresponding power domains by sharing the target output voltage. Therefore, the PMIC 100 or 101 may enhance efficiency in low power scenario.

As mentioned above, the efficiency of a DC-DC converter is low when the commanded output voltage (target voltage) is low. Also, the efficiency of a DC-DC converter is low when the demanded load current is low. When the DVFS controller 420 commands changes to output voltages and clock rates, there are situations in which one DC-DC converter can supply the commanded voltage and demanded load current for more than one power domain. The provision of the target voltage and load current (as needed) is referred to herein as "sharing" and the target voltage used for more than one power domain is referred to as a "global" voltage. By performing the sharing, a converter is used which is operating at a good efficiency for the target voltage and the demanded load current.

Figure 5:
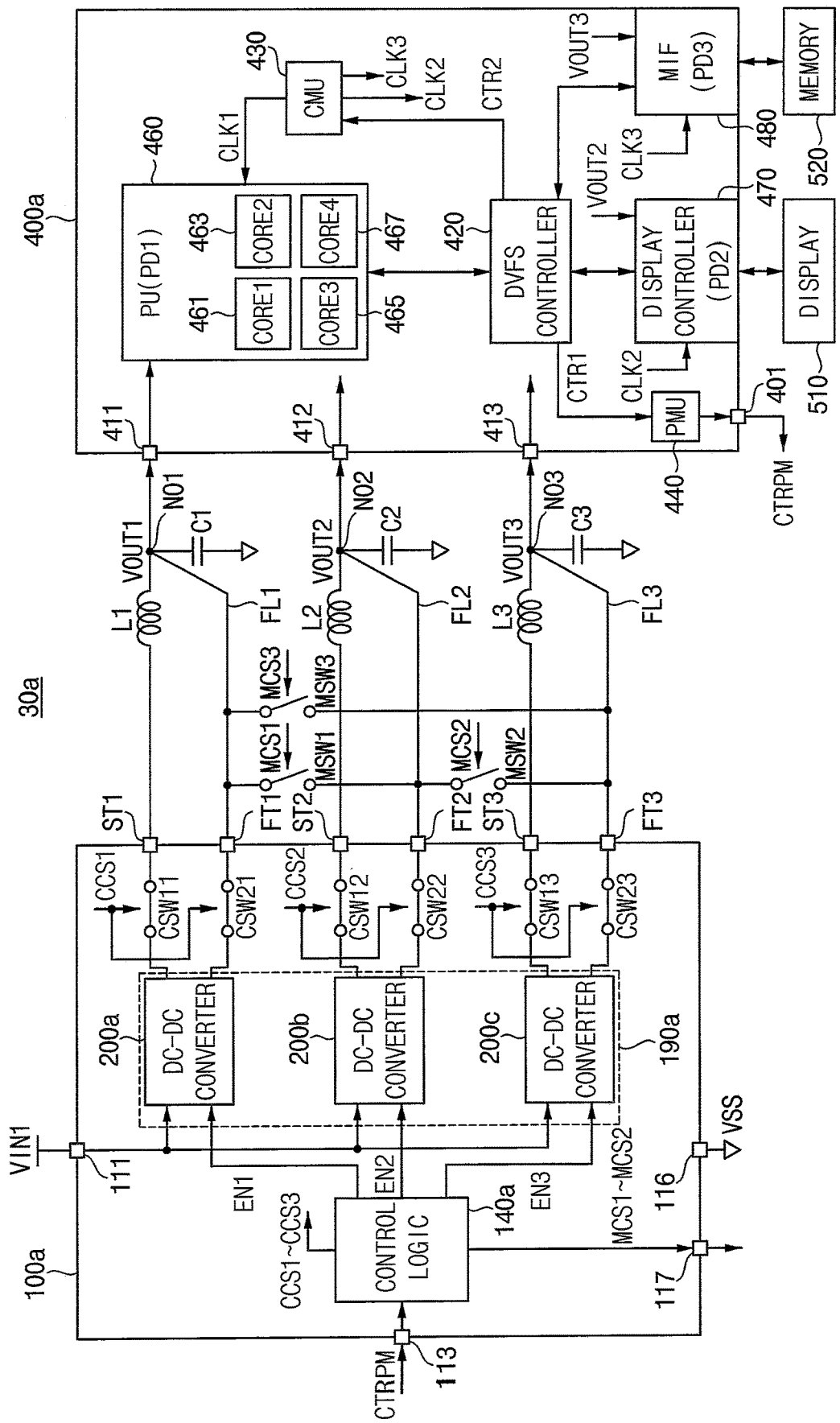
FIG. 5 is a block diagram illustrating an example of an electronic device in the computing system of FIG. 1 according to example embodiments.

FIG. 5 is a block diagram illustrating an example of an electronic device in the computing system of FIG. 1 according to example embodiments.

As mentioned above, FIGS. 6, 7 and 8 illustrate examples in which an output voltage of a global DC-DC converter is shared in the electronic device of FIG. 5.

Figure 6:
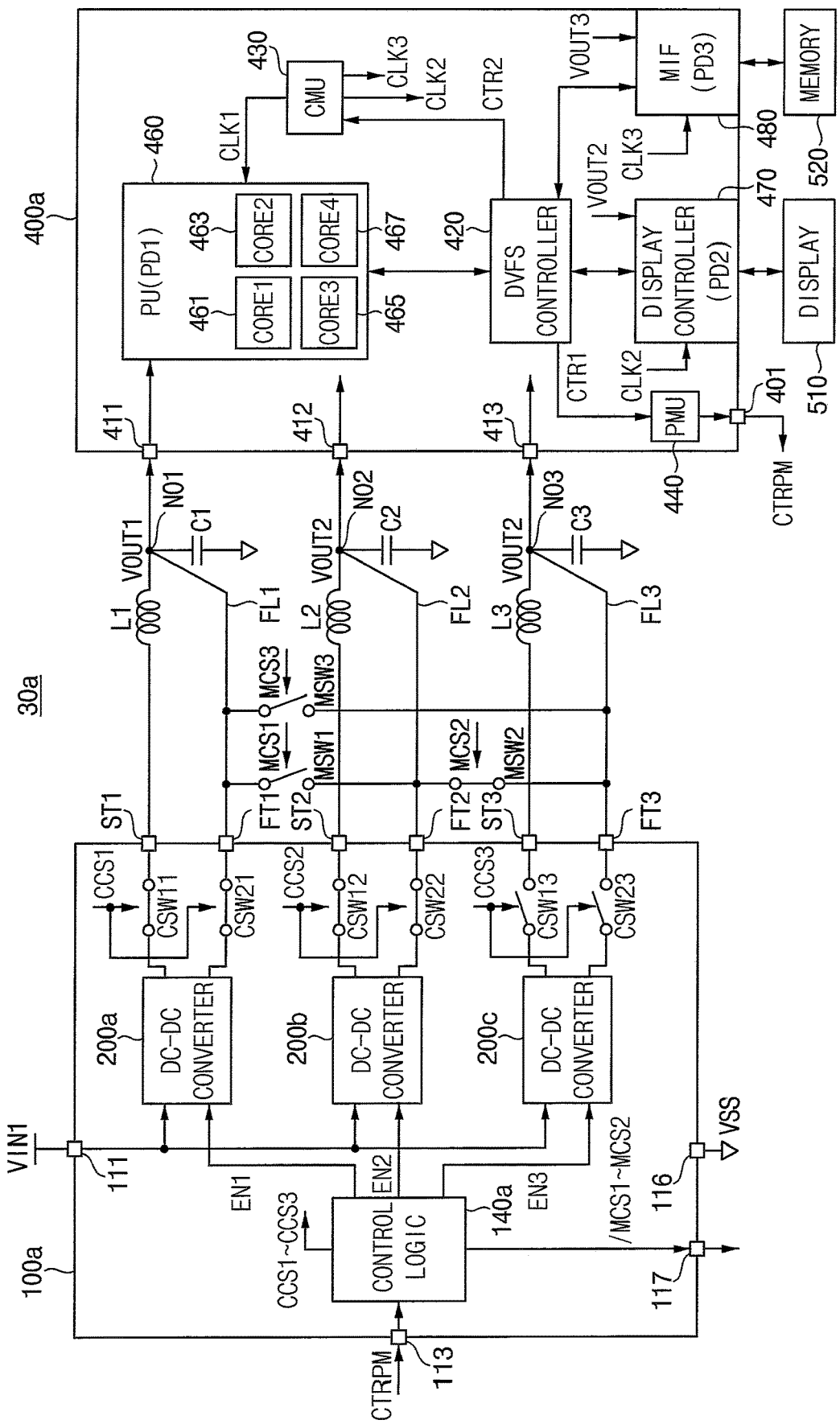
FIGS. 6, 7 and 8 illustrates examples in which an output voltage of a global DC-DC converter is shared in the electronic device of FIG. 5, respectively.
Figure 7:
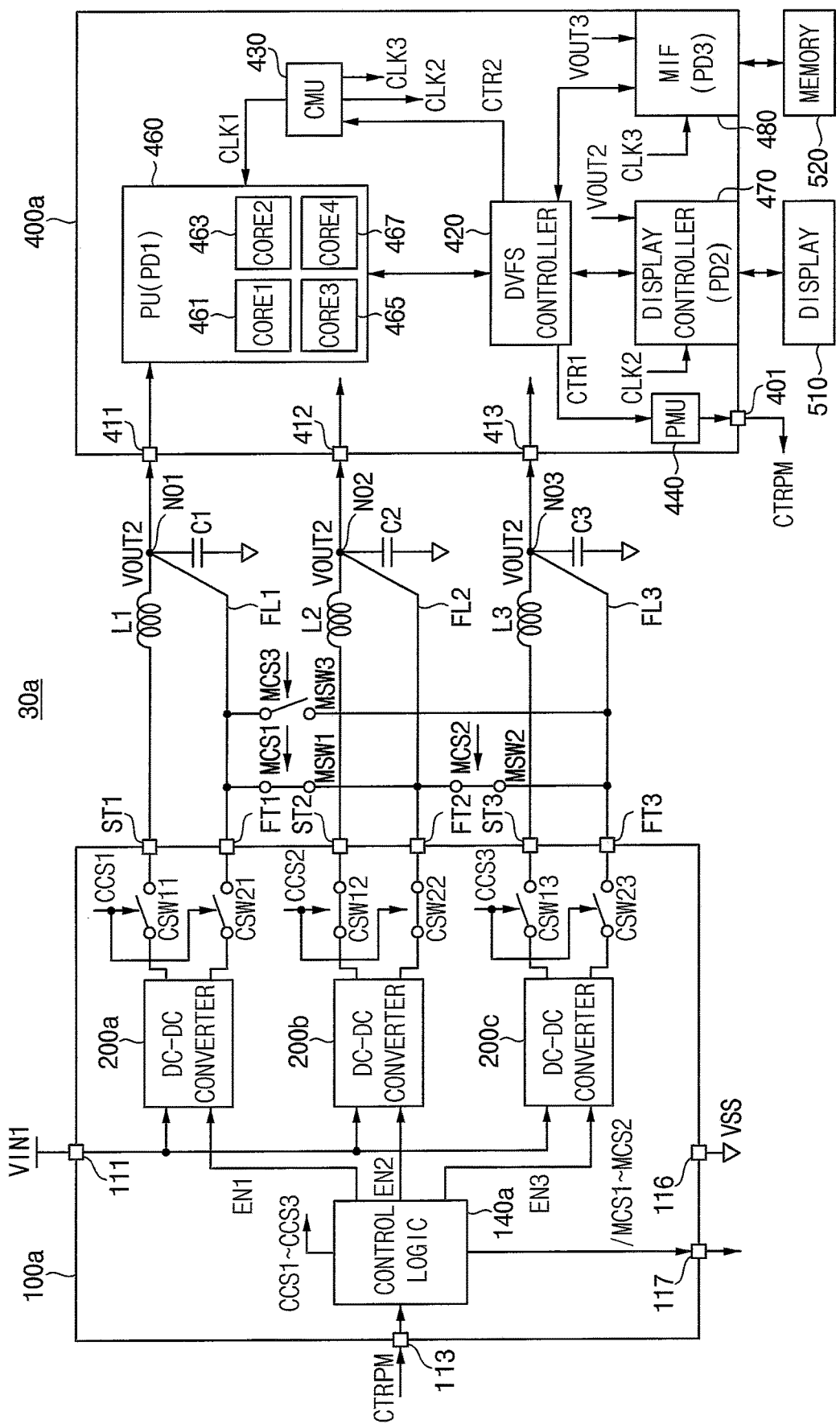
Figure 8:
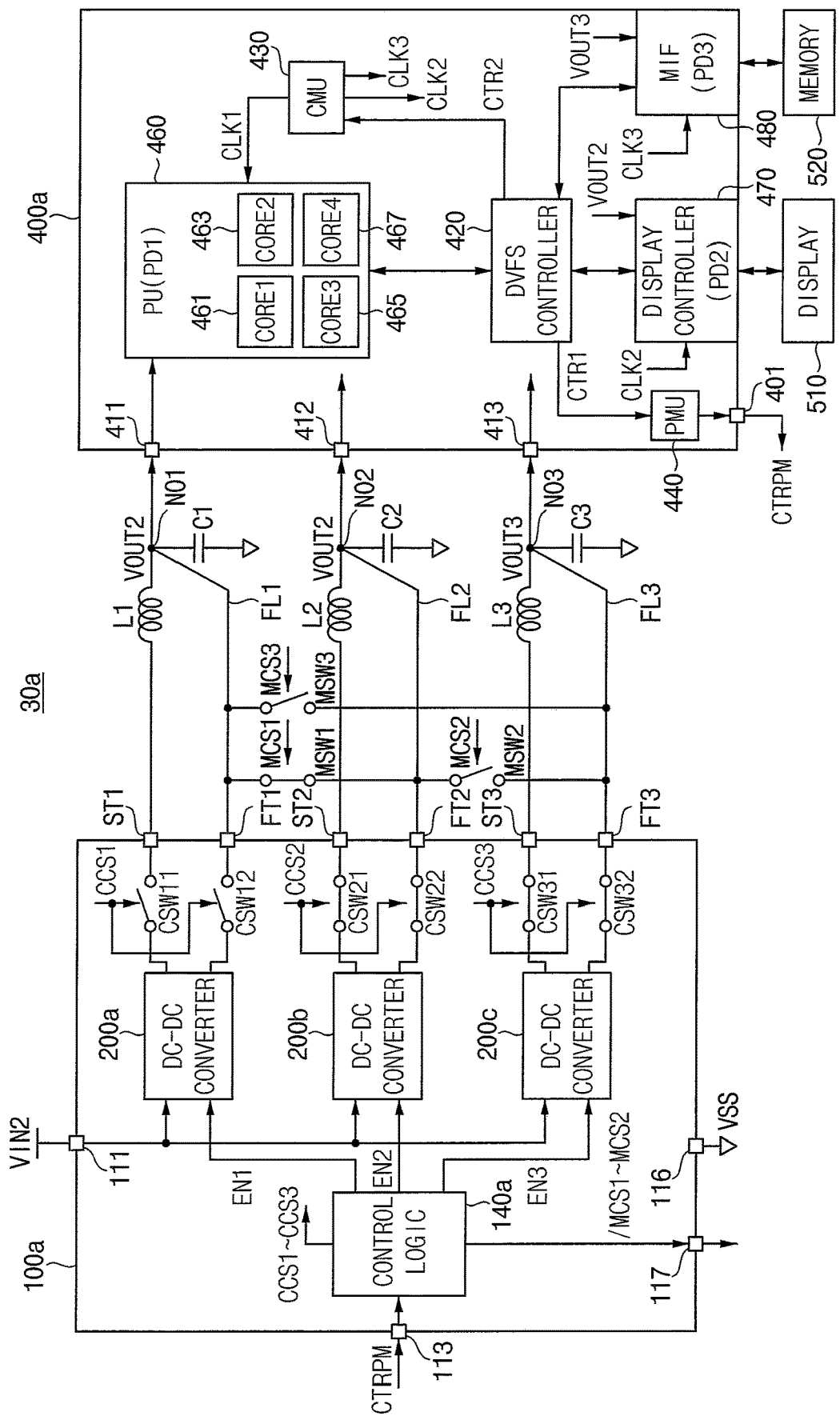
Figure 9:
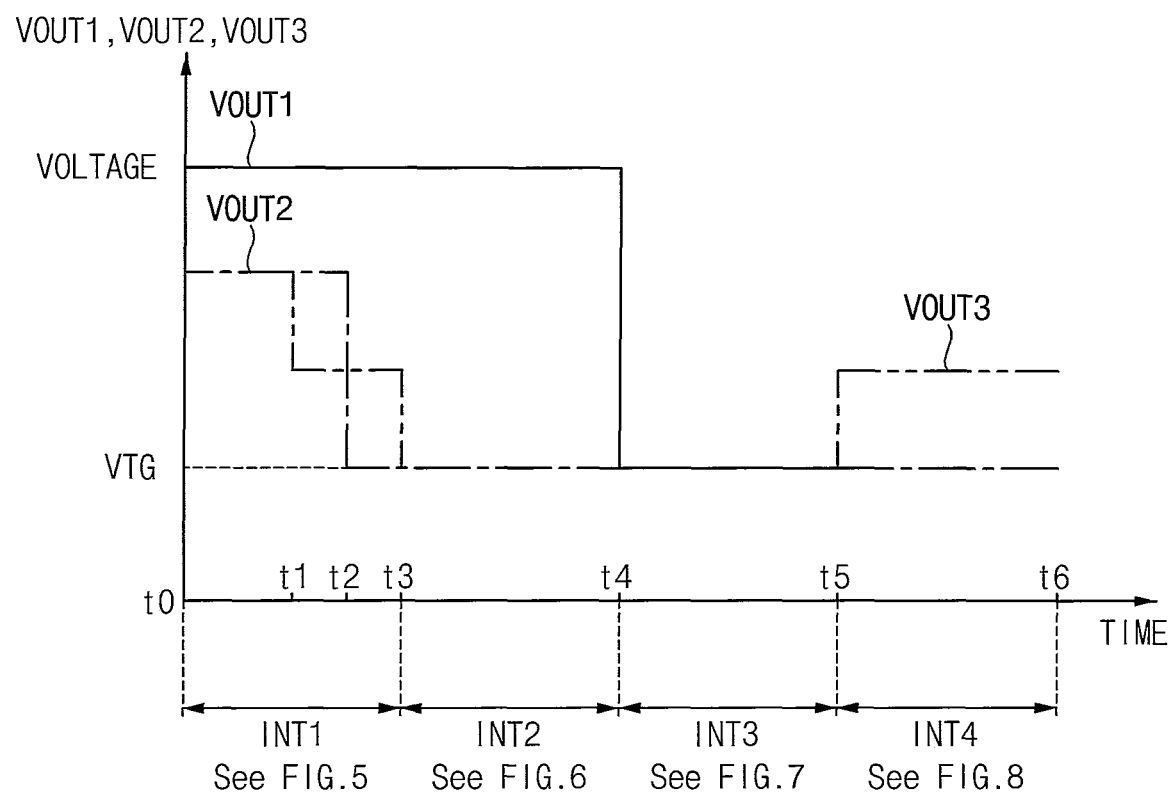
FIG. 9 illustrates a level of the output voltage in each example of FIGS. 6, 7 and 8, respectively.

FIG. 9 illustrates a level of the output voltage in each example of FIGS. 6, 7 and 8, respectively.

In FIG. 5, it is assumed that the converter block 190 in FIG. 2A includes three DC-DC converters and the SoC 400 in FIG. 3 includes three power domains. Descriptions repeated with FIGS. 2A and 3 will be omitted.

Referring to FIG. 5, an electronic device 30a may include a PMIC 100a and an SoC 400a.

The PMIC 100a may include input voltage terminals 111 and 112, switching terminals ST1, ST2, and ST3, feedback terminals FT1, FT2, and FT3, a ground voltage terminal 116, GPIO terminals 113 and 117, an SCL terminal 114, an SDA terminal 115, an LDO block 130, a control logic 140a, a communication interface 150 and a converter block 190a. The converter block 190a may include a plurality of DC-DC converters 200a, 200b and 200c. The PMIC 100a may further include a plurality of first connection switches CSW11, CSW12 and CSW13 and a plurality of second connection switches CSW21, CSW22 and CSW23.

Each of the plurality of DC-DC converters 200a, 200b and 200c may be connected to respective one of the switching terminals ST1, ST2 and ST3 via respective one of the plurality of first connection switches CSW11, CSW12 and CSW13 and may provide respective one of the plurality of output voltages VOUT1, VOUT2 and VOUT3 to respective one of the output nodes NO1, NO2 and NO3 via respective one of the switching terminals ST1, ST2 and ST3. Each of the plurality of DC-DC converters 200a, 200b and 200c may be connected to respective one of the feedback terminals FT1, FT2 and FT3 via respective one of the plurality of second connection switches CSW21, CSW22 and CSW23, and may be fed back with respective one of the plurality of output voltages VOUT1, VOUT2 and VOUT3 through respective one of the feedback lines FL1, FL2 and FL3 connected to the feedback terminals FT1, FT2 and FT3, respectively.

The control logic 140 may generate a plurality of enable signals EN1, EN2 and EN3 based on the power management control signal CTRPM, and may provide each of the enable signals EN1, EN2 and EN3 to respective one of the DC-DC converters 200a, 200b and 200c to control activation and deactivation of each of the DC-DC converters 200a, 200b and 200c, respectively.

The control logic 140 may generate a plurality of connection control signals CCS1, CCS2 and CCS3 based on the power management control signal CTRPM and may provide the connection control signals CCS1, CCS2 and CCS3 to the first connection switches CSW11, CSW12 and CSW13 and the second connection switches CSW21, CSW22 and CSW23 to controlling the on state or the off state of the first connection switches CSW11, CSW12 and CSW13 and the second connection switches CSW21, CSW22 and CSW23.

The first connection switches CSW11, CSW12 and CSW13 and the second connection switches CSW21, CSW22 and CSW23 are turned on or turned off by one pair. When a corresponding pair of the first connection switches CSW11, CSW12 and CSW13 and the second connection switches CSW21, CSW22 and CSW23 are turned off, the corresponding pair may prevent a current due to the shared target output voltage from flowing into a corresponding DC-DC converter.

The control logic 140 may generate a plurality of merging control signals MCS1, MCS2 and MCS3 based on the power management control signal CTRPM and may provide the merging control signals MCS1, MCS2 and MCS3 to the merging switches MSW1~MSW3 via the GPIO terminal 117 to controlling the on state or the off state of the merging switches MSW1, MSW2 and MSW3.

The control logic 140 may turn on the merging switch to connect a feedback line of the global DC-DC converter with a feedback line of the at least one first DC-DC converter sharing the target output voltage and may turn off the merging switches to connect the feedback line of the global DC-DC converter with the feedback lines of the DC-DC converters not sharing the target output voltage.

The SoC 400a may include voltage terminals 411, 412 and 413, a GPIO terminal 401, a processing unit 460 belonging to a first power domain PD1, a display controller 470 belonging to a second power domain PD2, a DVFS controller 420 and a memory interface 480 belonging to a third power domain PD3. In example embodiments, the SoC 400a may further include a CMU 430 that generates clock signals CLK1, CLK2 and CLK3 and a PMU 440.

The processing unit 460 may include a plurality of processor cores (CORE1, CORE2, CORE3 and CORE4) 461, 463, 465 and 467. In other words, the processing unit 460 may be a multi-core processing unit. At least one of the plurality of processor cores 461, 463, 465 and 467 may be driven by the processing unit 460 to perform at least one of various operations, works or jobs, such as particular calculations, tasks and controls.

In example embodiments, the processing unit 460 may include a central processing unit (CPU) or a graphic processing unit (GPU). In example embodiments, the processing unit 460 may include any processing units, e.g., an image signal processor (ISP), a digital signal processor (DSP), a display processor, a communication processor (e.g., a modem chip), a multimedia processor, or the like.

The processing unit 460 belonging to the first power domain PD1 may operate based on the first output voltage VOUT1 and the first clock signal CLK1, the display controller 470 belonging to the second power domain PD2 may operate based on the second output voltage VOUT2 and the second clock signal CLK2, and the memory interface 480 belonging to the third power domain PD3 may operate based on the third output voltage VOUT3 and the third clock signal CLK3.

The time axis in FIG. 9 is marked with time instants t0 on the left to t6 on the right. Between t0 and t6 occur time instants t1, t2, t3, t4 and t5 which are discussed below.

FIG. 9 illustrates control by the DFVS controller 420 of the output voltages of the DC-DC converters 200a, 200b and 200c. At an initial time t0, VOUT2=VOUT3, and both are less than VOUT1. At time instants t1 and t3, DC-DC converter 200b responds to control from DVFS controller 420 and reduces its output voltage, arriving at a value of VTG at t3. At time instant t2, DC-DC converter 200c responds to control from DVFS controller 420 and reduces its output voltage, arriving at a value of VTG at t2. At time instant t4, DC-DC converter 200a responds to control from DVFS controller 420 and reduces its output voltage, arriving at a value of VTG. At a later time, t5, DC-DC converter 200a responds to control from DVFS controller 420 and increases its output voltage. These voltage changes are discussed in more detail below.

Referring to FIGS. 5 and 9 together, during a first interval INT1 extending from t0 to t3, a voltage level of the first output voltage VOU1 is greatest, a voltage level of the second output voltage VOUT2 is smaller than the voltage level of the first output voltage VOU1, the voltage level of the second output voltage VOUT2 is reduced two times to have a target level VTG, and a voltage level of the third output voltage VOUT3 is smaller than the voltage level of the first output voltage VOUT1 and is greater than the target level VTG. When the voltage level of the second output voltage VOUT2 arrives at the target level VTG at time instant t3, the control logic 140 may designate the DC-DC converter 200b as a global DC-DC converter.

In FIG. 5, the voltage levels of the first output voltage VOUT1 and the third output voltage VOUT3 are greater than the target level VTG. Therefore, the control logic 140 may provide the enable signals EN1, EN2 and EN3 to the DC-DC converters 200a, 200b and 200c, respectively, to enable the DC-DC converters 200a, 200b and 200c, respectively.

The control logic 140 may turn on the first connection switches CSW11, CSW12 and CSW13 and the second connection switches CSW21, CSW22 and CSW23 by applying the connection control signals CCS1, CCS2 and CCS3 to the first connection switches CSW11, CSW12 and CSW13 and the second connection switches CSW21, CSW22 and CSW23, respectively. The control logic 140 may turn off the merging switches MSW1, MSW2 and MSW3 by applying the merging control signals MCS1, MCS2 and MCS3 to the merging switches MSW1, MSW2 and MSW3, respectively via the GPIO terminal 117.

Referring to FIGS. 6 and 9, during a second interval INT2 extending from t3 to t4, a voltage level of the third output voltage VOU3 is reduced to have the target level VTG by DVFS. Therefore, the control logic 140 may enable the DC-DC converters 200a and 200b and may disable the DC-DC converter 200c by applying the enable signals EN1, EN2 and EN3 to the DC-DC converters 200a, 200b and 200c, respectively.

The control logic 140 may turn on the first connection switches CSW11 and CSW12 and the second connection switches CSW21 and CSW22 and may turn off the first connection switch SCW13 and the second connection switch CSW23 by applying the connection control signals CCS1, CCS2 and CCS3 to the first connection switches CSW11, CSW12 and CSW13 and the second connection switches CSW21, CSW22 and CSW23, respectively.

The control logic 140 may turn off the merging switches MSW1 and MSW3 and may turn on the merging switch MSW1 by applying the merging control signals MCS1, MCS2 and MCS3 to the merging switches MSW1, MSW2 and MSW3, respectively via the GPIO terminal 117. For example, the merging switch MSW1 may selectively connect the feedback line FL1 of the DC-DC converter 200a with the feedback line FL2 of the DC-DC converter 200b in response to the merging control signal MCS1. The merging switch MSW2 may selectively connect the feedback line FL2 of the DC-DC converter 200b with the feedback line FL3 of the DC-DC converter 200c in response to the merging control signal MCS2. The merging switch MSW3 may selectively connect the feedback line FL1 of the DC-DC converter 200a with the feedback line FL3 of the DC-DC converter 200c in response to the merging control signal MCS3.

Referring to FIGS. 7 and 9, during a third interval INT3 extending from t4 to t5, the voltage level of the third output voltage VOU3 is maintained with the target level VTG and the voltage level of the first output voltage VOUT1 is reduced to have the target level VTG by DVFS. Therefore, the control logic 140 may enable the DC-DC converter 200b corresponding to the global DC-DC converter and may disable the DC-DC converters 200a and 200c by applying the enable signals EN1, EN2 and EN3 to the DC-DC converters 200a, 200b and 200c, respectively.

The control logic 140 may turn off the first connection switches CSW11 and CSW13 and the second connection switches CSW21 and CSW23 and may turn on the first connection switch SCW12 and the second connection switch CSW22 by applying the connection control signals CCS1, CCS2 and CCS3 to the first connection switches CSW11, CSW12 and CSW13 and the second connection switches CSW21, CSW22 and CSW23, respectively.

The control logic 140 may turn off the merging switch MSW3 and may turn on the merging switches MSW1 and MSW2 by applying the merging control signals MCS1, MCS2 and MCS3 to the merging switches MSW1, MSW2 and MSW3, respectively via the GPIO terminal 117 to connect feedback lines FL1 and FL3 of the DC-DC converters 200a and 200c to the feedback line FL2 of the DC-DC converter 200b corresponding to the global DC-DC converter such that the second output voltage VOUT2 is shared by the power domains PD1, PD2 and PD3.

Referring to FIGS. 8 and 9, during a fourth interval INT4 extending from t5 to t6, the voltage levels of the first output voltage VOUT1 and the second output voltage VOUT2 are maintained with the target level VTG and the voltage level of the first output voltage VOUT1 is increased to have a voltage level greater than the target level VTG by DVFS. Therefore, the control logic 140 may enable the DC-DC converter 200a and the DC-DC converter 200b corresponding to the global DC-DC converter and may disable the DC-DC converter 200c by applying the enable signals EN1, EN2 and EN3 to the DC-DC converters 200a, 200b and 200c, respectively.

The control logic 140 may turn off the first connection switches CSW11 and CSW12 and the second connection switches CSW21 and CSW22 and may turn on the first connection switch SCW13 and the second connection switch CSW23 by applying the connection control signals CCS1, CCS2 and CCS3 to the first connection switches CSW11, CSW12 and CSW13 and the second connection switches CSW21, CSW22 and CSW23, respectively.

The control logic 140 may turn off the merging switches MSW2 and MSW3 and may turn on the merging switch MSW1 by applying the merging control signals MCS1, MCS2 and MCS3 to the merging switches MSW1, MSW2 and MSW3, respectively via the GPIO terminal 117 to connect feedback line FL1 of the DC-DC converters 200a to the feedback line FL2 of the DC-DC converter 200b corresponding to the global DC-DC converter such that second output voltage VOUT2 is shared by the power domains PD1 and PD2.

In example embodiments, first connection switches CSW11, CSW12 and CSW13 and the second connection switches CSW21, CSW22 and CSW23 in FIGS. 5 through 8, may be not included in the PMIC 100a as described with reference to FIG. 2B, and each of the DC-DC converters 200a, 200b and 200c may be directly connected to respective one of the switching terminals ST1, ST2 and ST3 and to respective one of the feedback terminals FT1, FT2 and FT3. That is, the control logic 140 may control the merging switches MSW1, MSW2 and MSW3 such that an output voltage of the global DC-DC converter may be shared by applying the merging control signals MCS1, MCS2 and MCS3 to the merging switches MSW1, MSW2 and MSW3, respectively.

Figure 10:
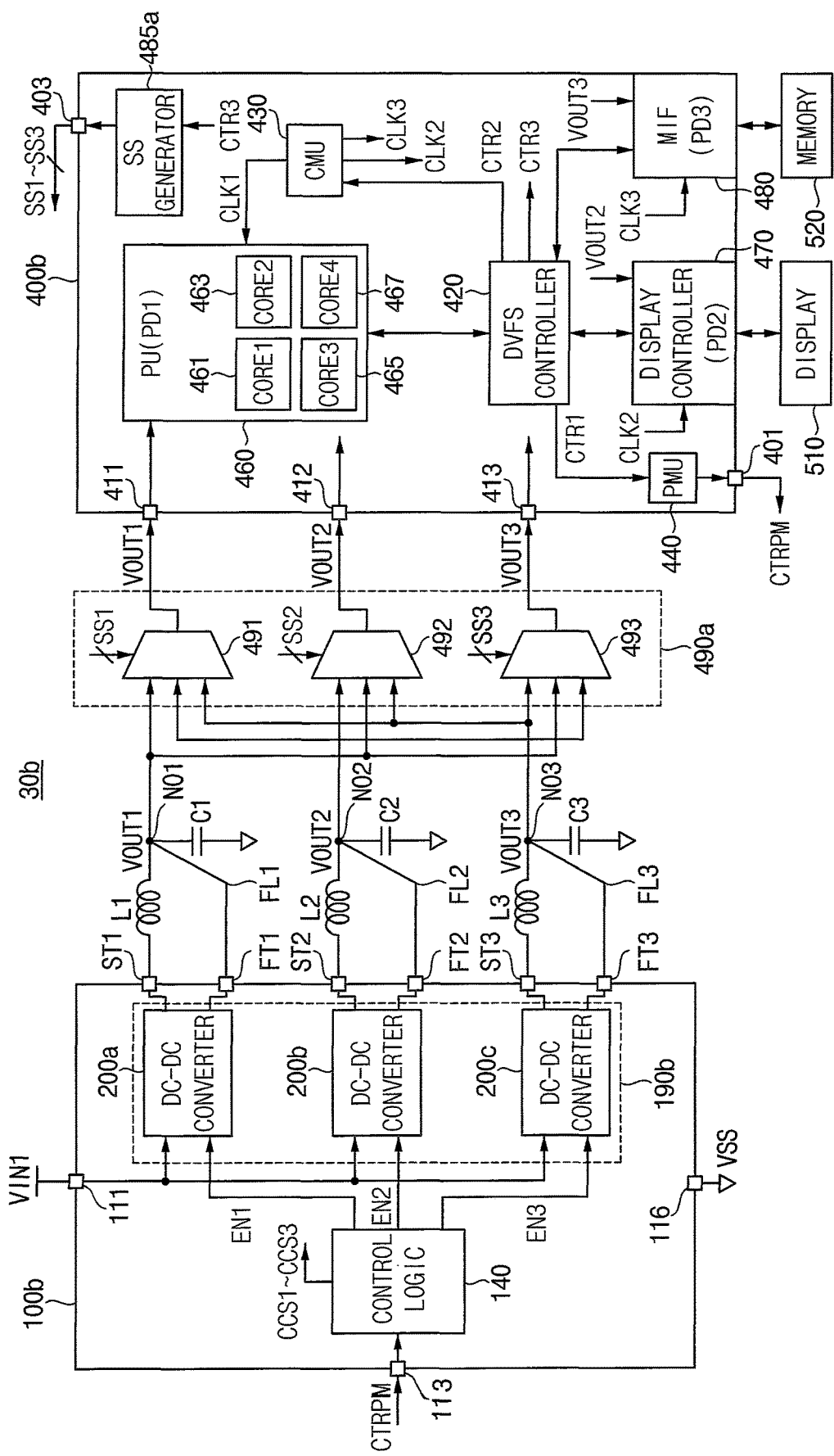
FIG. 10 is a block diagram illustrating an example of an electronic device in the computing system of FIG. 1 according to example embodiments.

FIG. 10 is a block diagram illustrating an example of an electronic device in the computing system of FIG. 1 according to example embodiments.

In FIG. 10, assuming that the converter block 190 in FIG. 1 includes three DC-DC converters and the SoC 400 in FIG. 1 includes three power domains.

Referring to FIG. 10, an electronic device 30b may include a PMIC 100b, an SoC 400b and a selection circuit 490a.

The PMIC 100b may include input voltage terminals 111 and 112, switching terminals ST1, ST2 and ST3, feedback terminals FT1, FT2 and FT3, a ground voltage terminal 116, a GPIO terminal 113, a control logic 140 and a converter block 190b. The converter block 190b may include a plurality of DC-DC converters 200a, 200b and 200c.

Each of the plurality of DC-DC converters 200a, 200b and 200c may be connected to respective one of the switching terminals ST1, ST2 and ST3 and may provide respective one of the plurality of output voltages VOUT1, VOUT2 and VOUT3 to respective one of the output nodes NO1~NO3 via respective one of the switching terminals ST1, ST2 and ST3. Each of the plurality of DC-DC converters 200a, 200b and 200c may be connected to respective one of the feedback terminals FT1, FT2 and FT3 and may be fed back with respective one of the plurality of output voltages VOUT1, VOUT2 and VOUT3 through respective one of the feedback lines FL1, FL2 and FL3 connected to the feedback terminals FT1, FT2 and FT3, respectively.

The control logic 140 may generate a plurality of enable signals EN1, EN2 and EN3 based on the power management control signal CTRPM, and may provide each of the enable signals EN1, EN2 and EN3 to respective one of the DC-DC converters 200a, 200b and 200c to control activation and deactivation of each of the DC-DC converters 200a, 200b and 200c, respectively.

The selection circuit 490a may be disposed between the PMIC 100b and the SoC 400b and may include a plurality of multiplexers 491, 492 and 493.

Each of the multiplexers 491, 492 and 493 may be connected to the output nodes NO1, NO2 and NO3 and may receive the output voltages VOUT1, VOUT2 and VOUT3. Each of the multiplexers 491, 492 and 493 may receive respective one of selection signals SS1, SS2 and SS3 from the PMIC 400b, may select corresponding one of the output voltages VOUT1, VOUT2 and VOUT3 in response to respective one of selection signals SS1, SS2 and SS3 and may provide the selected one to respective one of the power domains PD1, PD2 and PD3.

The SoC 400b may include voltage terminals 411, 412 and 413, GPIO terminals 401 and 403, a processing unit 460 belonging to a first power domain PD1, a display controller 470 belonging to a second power domain PD2, a memory interface 480 belonging to a third power domain PD3, a DVFS controller 420 and a selections signal generator 485a.

In example embodiments, the SoC 400b may further include a CMU 430 and a PMU 440. The CMU may generate clock signals CLK1, CLK2 and CLK3 based on a clock control signal CTR2 from the DVFS controller 420. The PMU 440 may generate the power management control signal CTRPM based on a power control signal CTR1 from the DVFS controller 420, and may provide the power management control signal CTRPM to the PMIC 100b via the GPIO terminal 401.

The selection signal generator 485a may determine each level of the selection signals SS1, SS2 and SS3 based on a selection control signal CTR3 from the DVFS controller 420 and may provide the selection signals SS1, SS2 and SS3 to the multiplexers 491, 492 and 493, respectively, via the GPIO terminal 403.

When a voltage level of the first output voltage VOU1 is greatest, a voltage level of the second output voltage VOUT2 is smaller than the voltage level of the first output voltage VOU1, the voltage level of the second output voltage VOUT2 is reduced two times to have a target level VTG, and a voltage level of the third output voltage VOUT3 is smaller than the voltage level of the first output voltage VOUT1 and is greater than the target level VTG as during the first interval INT1 in FIG. 9, the selection signal generator 485a may determine each level of the selection signals SS1, SS2 and SS3 such that the multiplexer 491 selects the first output voltage VOUT1 from among the output voltages VOUT1, VOUT2 and VOUT3 in response to the selection signal SS1, the multiplexer 492 selects the second output voltage VOUT2 from among the output voltages VOUT1, VOUT2 and VOUT3 in response to the selection signal SS2 and the multiplexer 493 selects the third output voltage VOUT3 from among the output voltages VOUT1, VOUT2 and VOUT3 in response to the selection signal SS3.

Because the voltage terminal 411 is connected to the first power domain PD1, the voltage terminal 412 is connected to the second power domain PD2, and the voltage terminal 413 is connected to the third power domain PD3, each of the multiplexers 491, 492 and 493 provides respective one of the output voltages VOUT1, VOUT2 and VOUT3 to respective one of the power domains PD1, PD2 and PD3 via respective one of the voltage terminals 411, 412 and 413.

Figure 11:
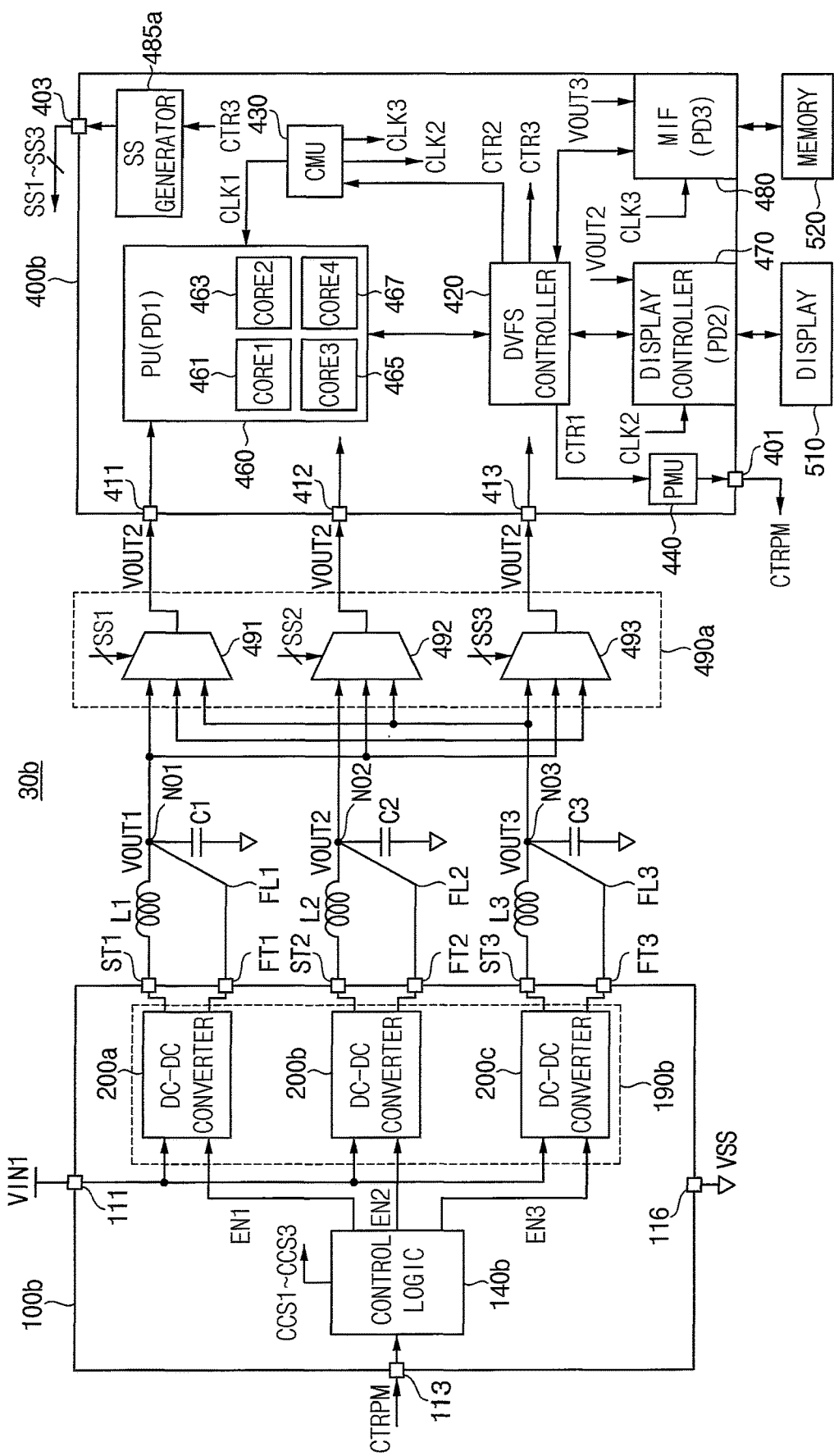
FIG. 11 illustrates an example in which an output voltage of the global DC-DC converter is shared in the electronic device of FIG. 10.

FIG. 11 illustrates an example in which an output voltage of the global DC-DC converter is shared in the electronic device of FIG. 10.

Referring to FIG. 11, when the voltage level of the third output voltage VOU3 is maintained with the target level VTG and the voltage level of the first output voltage VOUT1 is reduced to have the target level VTG by DVFS as during the third interval INT3 in FIG. 9, the control logic 140 may enable the DC-DC converter 200b corresponding to the global DC-DC converter and may disable the DC-DC converters 200a and 200c by applying the enable signals EN1, EN2 and EN3 to the DC-DC converters 200a, 200b and 200c, respectively.

The selection signal generator 485a may determine each level of the selection signals SS1, SS2 and SS3 such that the multiplexer 491 selects the second output voltage VOUT2 from among the output voltages VOUT1, VOUT2 and VOUT3 in response to the selection signal SS1, the multiplexer 492 selects the second output voltage VOUT2 from among the output voltages VOUT1, VOUT2 and VOUT3 in response to the selection signal SS2 and the multiplexer 493 selects the second output voltage VOUT2 from among the output voltages VOUT1, VOUT2 and VOUT3 in response to the selection signal SS3.

Because the voltage terminal 411 is connected to the first power domain PD1, the voltage terminal 412 is connected to the second power domain PD2, and the voltage terminal 413 is connected to the third power domain PD3, each of the multiplexers 491, 492 and 493 provides the output voltage VOUT2 to respective one of the power domains PD1, PD2 and PD3 via respective one of the voltage terminals 411, 412 and 413.

Figure 12:
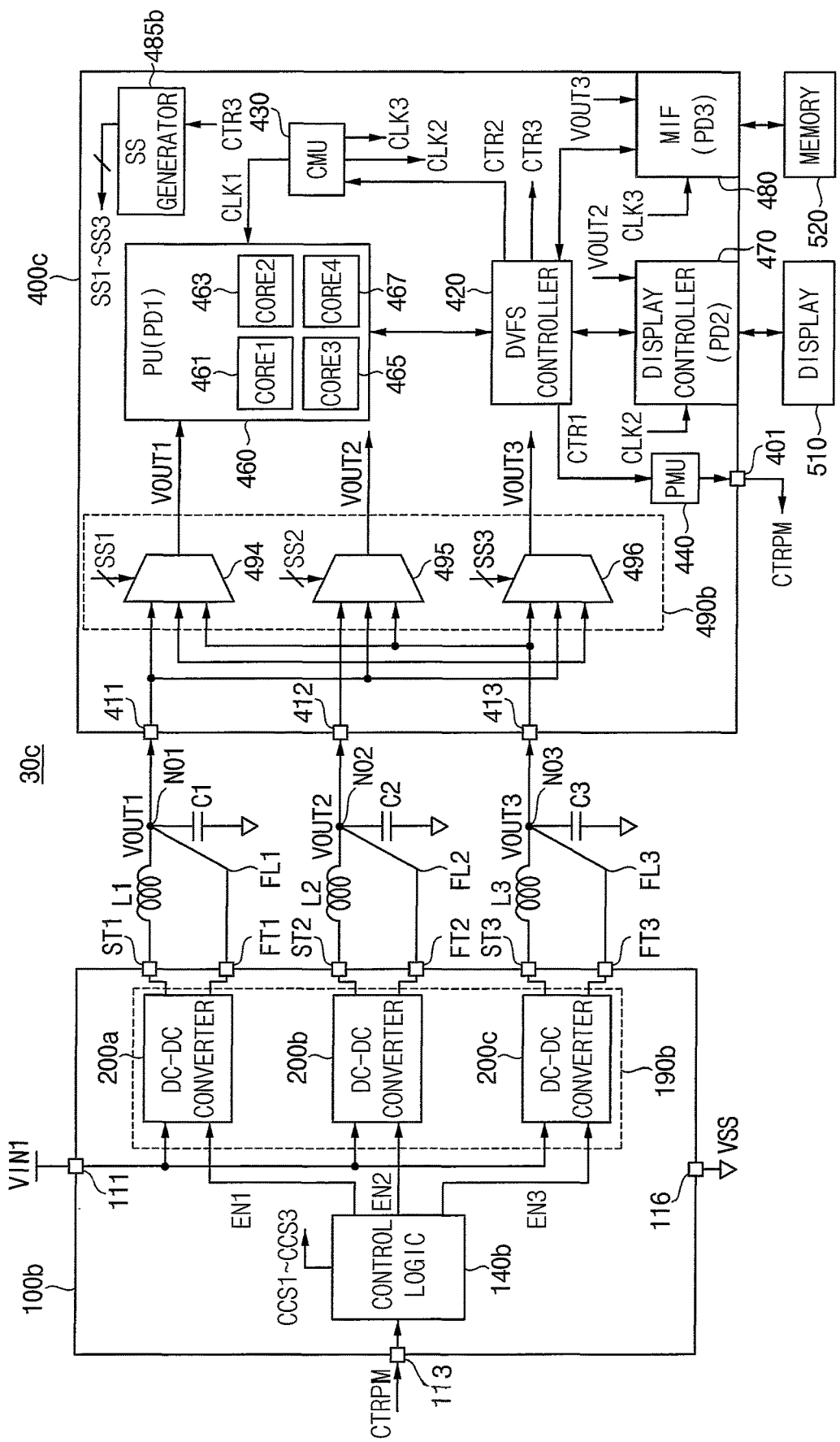
FIG. 12 is a block diagram illustrating an example of an electronic device in the computing system of FIG. 1 according to example embodiments.

FIG. 12 is a block diagram illustrating an example of an electronic device in the computing system of FIG. 1 according to example embodiments.

In FIG. 12, assuming that the converter block 190 in FIG. 1 includes three DC-DC converters and the SoC 400 in FIG. 1 includes three power domains.

Referring to FIG. 12, an electronic device 30c may include a PMIC 100b and an SoC 400c.

The PMIC 100b may include input voltage terminals 111 and 112, switching terminals ST1, ST2 and ST3, feedback terminals FT1, FT2 and FT3, a ground voltage terminal 116, a GPIO terminal 113, a control logic 140 and a converter block 190b. The converter block 190b may include a plurality of DC-DC converters 200a, 200b and 200c.

Each of the plurality of DC-DC converters 200a, 200b and 200c may be connected to respective one of the switching terminals ST1, ST2 and ST3 and may provide respective one of the plurality of output voltages VOUT1, VOUT2 and VOUT3 to respective one of the output nodes NO1~NO3 via respective one of the switching terminals ST1, ST2 and ST3. Each of the plurality of DC-DC converters 200a, 200b and 200c may be connected to respective one of the feedback terminals FT1, FT2 and FT3 and may be fed back with respective one of the plurality of output voltages VOUT1, VOUT2 and VOUT3 through respective one of the feedback lines FL1, FL2 and FL3 connected to the feedback terminals FT1, FT2 and FT3, respectively.

The control logic 140 may generate a plurality of enable signals EN1, EN2 and EN3 based on the power management control signal CTRPM, and may provide each of the enable signals EN1, EN2 and EN3 to respective one of the DC-DC converters 200a, 200b and 200c to control activation and deactivation of each of the DC-DC converters 200a~200c, respectively.

The SoC 400c may include voltage terminals 411, 412 and 413, GPIO terminals 401 and 403, a processing unit 460 belonging to a first power domain PD1, a display controller 470 belonging to a second power domain PD2, a memory interface 480 belonging to a third power domain PD3, a DVFS controller 420, a selection circuit 490b and a selections signal generator 485b.

In example embodiments, the SoC 400c may further include a CMU 430 and a PMU 440. The CMU may generate clock signals CLK1, CLK2 and CLK3 based on a clock control signal CTR2 from the DVFS controller 420. The PMU 440 may generate the power management control signal CTRPM based on a power control signal CTR1 from the DVFS controller 420, and may provide the power management control signal CTRPM to the PMIC 100b via the GPIO terminal 401.

The selection circuit 490b may include a plurality of multiplexers 494, 495 and 496. Each of the multiplexers 494, 495 and 496 may be connected to the voltage terminals 411, 412 and 413, and may receive the output voltages VOUT1, VOUT2 and VOUT3. Each of the multiplexers 494, 495 and 496 may receive respective one of selection signals SS1, SS2 and SS3 from the selection signal generator 485b, may select corresponding one of the output voltages VOUT1, VOUT2 and VOUT3 in response to respective one of selection signals SS1, SS2 and SS3 and may provide the selected one to respective one of the power domains PD1, PD2 and PD3.

The selection signal generator 485b may determine each level of the selection signals SS1, SS2 and SS3 based on a selection control signal CTR3 from the DVFS controller 420 and may provide the selection signals SS1, SS2 and SS3 to the multiplexers 491, 492 and 493, respectively.

When a voltage level of the first output voltage VOU1 is greatest, a voltage level of the second output voltage VOUT2 is smaller than the voltage level of the first output voltage VOU1, the voltage level of the second output voltage VOUT2 is reduced two times to have a target level VTG, and a voltage level of the third output voltage VOUT3 is smaller than the voltage level of the first output voltage VOUT1 and is greater than the target level VTG as during the first interval INT1 in FIG. 9, the selection signal generator 485b may determine each level of the selection signals SS1, SS2 and SS3 such that the multiplexer 494 selects the first output voltage VOUT1 from among the output voltages VOUT1, VOUT2 and VOUT3 in response to the selection signal SS1, the multiplexer 495 selects the second output voltage VOUT2 from among the output voltages VOUT1, VOUT2 and VOUT3 in response to the selection signal SS2 and the multiplexer 496 selects the third output voltage VOUT3 from among the output voltages VOUT1, VOUT2 and VOUT3 in response to the selection signal SS3.

Because an output of the multiplexer 494 is connected to the first power domain PD1, an output of the multiplexer 495 is connected to the second power domain PD2, and an output of the multiplexer 496 is connected to the third power domain PD3, each of the multiplexers 494, 495 and 496 provides respective one of the output voltages VOUT1, VOUT2 and VOUT3 to respective one of the power domains PD1, PD2 and PD3.

Figure 13:
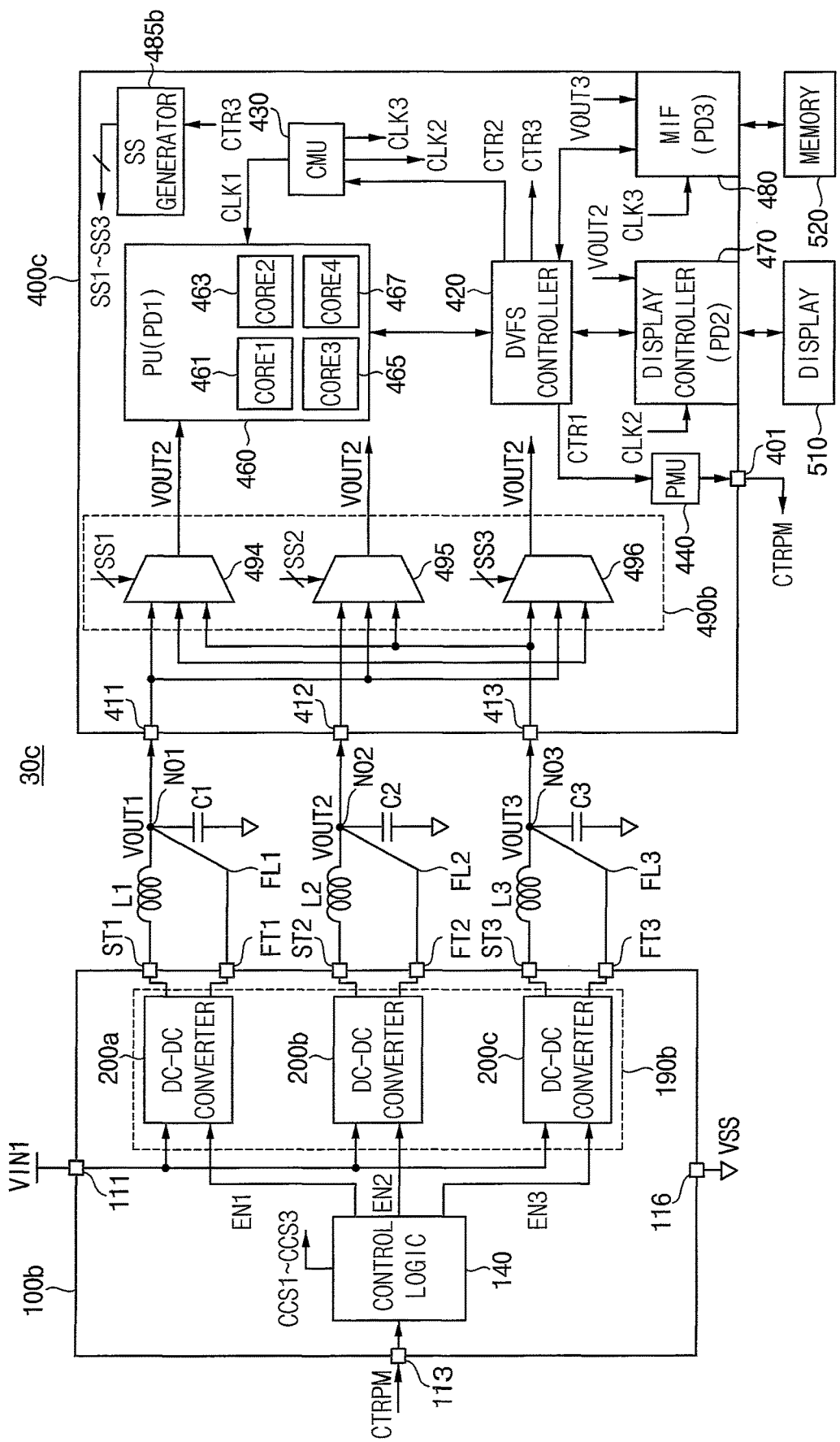
FIG. 13 illustrates an example in which an output voltage of the global DC-DC converter is shared in the electronic device of FIG. 12.

FIG. 13 illustrates an example in which an output voltage of the global DC-DC converter is shared in the electronic device of FIG. 12.

Referring to FIG. 13, when the voltage level of the third output voltage VOU3 is maintained with the target level VTG and the voltage level of the first output voltage VOUT1 is reduced to have the target level VTG by DVFS as during the third interval INT3 in FIG. 9, the control logic 140 may enable the DC-DC converter 200b corresponding to the global DC-DC converter and may disable the DC-DC converters 200a and 200c by applying the enable signals EN1, EN2 and EN3 to the DC-DC converters 200a, 200b and 200c, respectively.

The selection signal generator 485b may determine each level of the selection signals SS1, SS2 and SS3 such that the multiplexer 494 selects the second output voltage VOUT2 from among the output voltages VOUT1, VOUT2 and VOUT3 in response to the selection signal SS1, the multiplexer 495 selects the second output voltage VOUT2 from among the output voltages VOUT1, VOUT2 and VOUT3 in response to the selection signal SS2 and the multiplexer 496 selects the second output voltage VOUT2 from among the output voltages VOUT1, VOUT2 and VOUT3 in response to the selection signal SS3.

Because the output of the multiplexer 494 is connected to the first power domain PD1, the output of the multiplexer 495 is connected to the second power domain PD2, and the output of the multiplexer 496 is connected to the third power domain PD3, each of the multiplexers 494, 495 and 496 provides the output voltage VOUT2 to respective one of the power domains PD1, PD2 and PD3.

As mentioned above, the electronic device 30, 30a, 30b or 30c according to example embodiments, in a low power scenario, enables one of the DC-DC converters which generate the target output voltage corresponding to the smallest voltage level from among voltage levels which each of the DC-DC converters is capable of generating, and the enabled DC-DC converter provides the target output voltage to corresponding power domains by sharing the target output voltage. Therefore, the electronic device 30, 30a, 30b or 30c may enhance efficiency in the low power scenario.

FIG. 14 is a flow chart illustrating a method of controlling power in an electronic device according to example embodiments.

Referring to FIGS. 1 through 14, there is provided a method of controlling power in an electronic device 30 which includes an SoC400 including a plurality of power domains PD1~PDn and a DVFS controller 420 to perform DVFS on the plurality of power domains PD1~PD, each including at least one function block, and a PMIC 100 including a plurality of DC-DC converters 200a~200n.

According to the method, each of the DC-DC converters 200a~200n provides corresponding one of a plurality of output voltages VOUT1~VOUTn to respective one of the plurality of power domains PD1~PDn (operation S100).

A control logic 140 in the PMIC 100 designates a target DC-DC converter to provide a target output voltage having a target level, from among the plurality of DC-DC converters 200a~200n, as a global DC-DC converter based on the DVFS (or a power management control signal CTRPM from the SoC 400 (operation S200). The target level may correspond to smallest level from among voltage levels which each of the DC-DC converters 200a~200n is capable of generating.

The control logic 140 or the SoC 400 provides the target output voltage to a power domain corresponding to the global DC-DC converter and at least one first power domain consuming the target output voltage, from among the plurality of power domains PD1~PDn, by sharing the target output voltage provided from the global DC-DC converter (operation S300).

The control logic 140 designates another DC-DC converter as the global DC-DC converter based on DVFS (operation S400).

Each of the plurality of DC-DC converters 200a~200n may be implemented with a buck converter. When two or more DC-DC converters from among the plurality of DC-DC converters 200a~200n generate the target output voltage, respectively, efficiency of the two or more DC-DC converters is reduced and efficiency of the PMIC 100 may be reduced.

However, the electronic device 30, 30a, 30b or 30c according to example embodiments, in a low power scenario, enables one of the DC-DC converters 200a~200n which generate the target output voltage corresponding to the smallest voltage level from among voltage levels which each of the DC-DC converters 200a~200n is capable of generating, and the enabled DC-DC converter provides the target output voltage to corresponding power domains by sharing the target output voltage. Therefore, the electronic device 30, 30a, 30b or 30c may enhance efficiency in the low power scenario.

FIG. 15 is a flow chart illustrating an example of sharing an output voltage from the global DC-DC converter in FIG. 14 according to example embodiments.

Referring to FIG. 15, for sharing the output voltage from the global DC-DC converter (operation S300a), the control logic 140 controls a plurality of merging switches MSW1~MSWk to connect two different feedback lines from among a plurality of feedback lines FL1~FLn of the plurality of DC-DC converters 200a~200k such that the target output voltage is shared (operation S310a) as described with reference to FIGS. 2, and 5 through 8. Each of the plurality of feedback lines F11~FLn is connected to respective one of the plurality of output nodes NO1~NOn providing the plurality of output voltages VOUT1~VOUTn.

The control logic 140 may turn on a first merging switch to connect a feedback line of the global DC-DC converter with a feedback line of at least one first DC-DC converter providing the target output voltage, from among the plurality of merging switches MSW1~MSWk by applying merging control signals MCS1~MCSk to the merging switches MSW1~MSWk. In this case, the control logic 140 may turn off a first connection switch and a second connection switch associated with the at least one first DC-DC converter to current due to the shared target output voltage from flowing into the at least one first DC-DC converter.

FIG. 16 is a flow chart illustrating an example of sharing an output voltage from the global DC-DC converter in FIG. 14 according to example embodiments.

Referring to FIG. 16, for sharing the output voltage from the global DC-DC converter (operation S300b), the SoC 400b controls a plurality of multiplexers 491, 492 and 493 disposed between the PMIC 100b and the SoC 400b such that the target output voltage is shared (operation S310b).

As described with reference to FIGS. 10 and 11, each of the multiplexers 491, 492 and 493 may be connected to the output nodes NO1, NO2 and NO3 and may receive the output voltages VOUT1, VOUT2 and VOUT3. Each of the multiplexers 491, 492 and 493 may receive respective one of selection signals SS1, SS2 and SS3 from the PMIC 400b, may select corresponding one of the output voltages VOUT1, VOUT2 and VOUT3 in response to respective one of selection signals SS1, SS2 and SS3 and may provide the selected one to respective one of the power domains PD1, PD2 and PD3.

FIG. 17 is a flow chart illustrating an example of sharing an output voltage from the global DC-DC converter in FIG. 14 according to example embodiments.

Referring to FIG. 17, for sharing the output voltage from the global DC-DC converter (operation S300c), the SoC 400c controls a plurality of multiplexers 494, 495 and 496 disposed inside of the SoC 400c such that the target output voltage is shared (operation S310c).

As described with reference to FIGS. 12 and 13, each of the multiplexers 494, 495 and 496 may be connected to the voltage terminals 411, 412 and 413, and may receive the output voltages VOUT1, VOUT2 and VOUT3. Each of the multiplexers 494, 495 and 496 may receive respective one of selection signals SS1, SS2 and SS3 from the selection signal generator 485b, may select corresponding one of the output voltages VOUT1, VOUT2 and VOUT3 in response to respective one of selection signals SS1, SS2 and SS3 and may provide the selected one to respective one of the power domains PD1, PD2 and PD3.

As will be appreciated by those skilled in the art, the method of controlling power in an electronic device described with reference to FIGS. 14 through 17 may be embodied as a system, method, computer program product, and/or a computer program product embodied in one or more non-transitory computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 18:
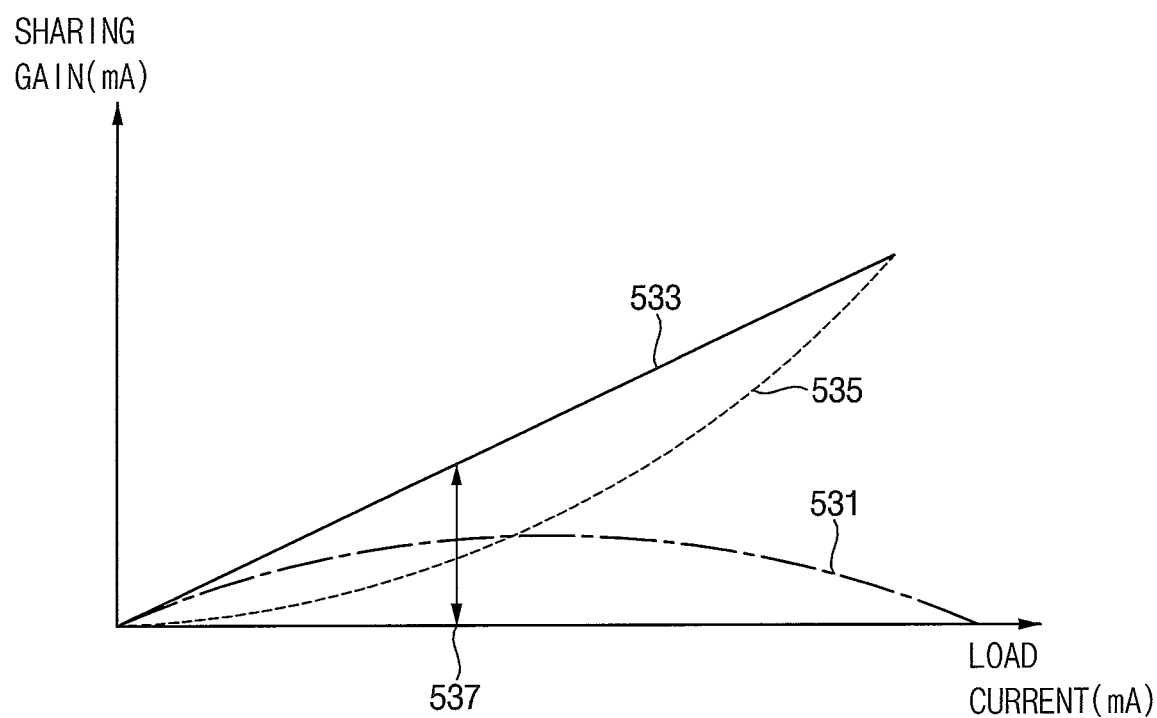
FIG. 18 a graph illustrating a sharing gain of a PMIC when the target output voltage is shared by at least two power domains.

FIG. 18 a graph illustrating a sharing gain of a PMIC when the target output voltage is shared by at least two power domains.

In FIG. 18, a horizontal axis represents a load current corresponding to an output voltage and a vertical axis represents a sharing gain of the PMIC 100. A reference numeral 531 represents an overall gain of the PMIC 100, a reference numeral 533 represents efficiency gain when the target output voltage is shared, a reference numeral 535 represents a conduction loss due to connection of feedback lines and a reference numeral 537 represents a maximum efficiency gain when the target output voltage is shared.

Referring to FIG. 18 it is noticeable that efficiency of the PMIC 100 is enhanced at a point where the efficiency crosses the conduction loss.

Figure 19:
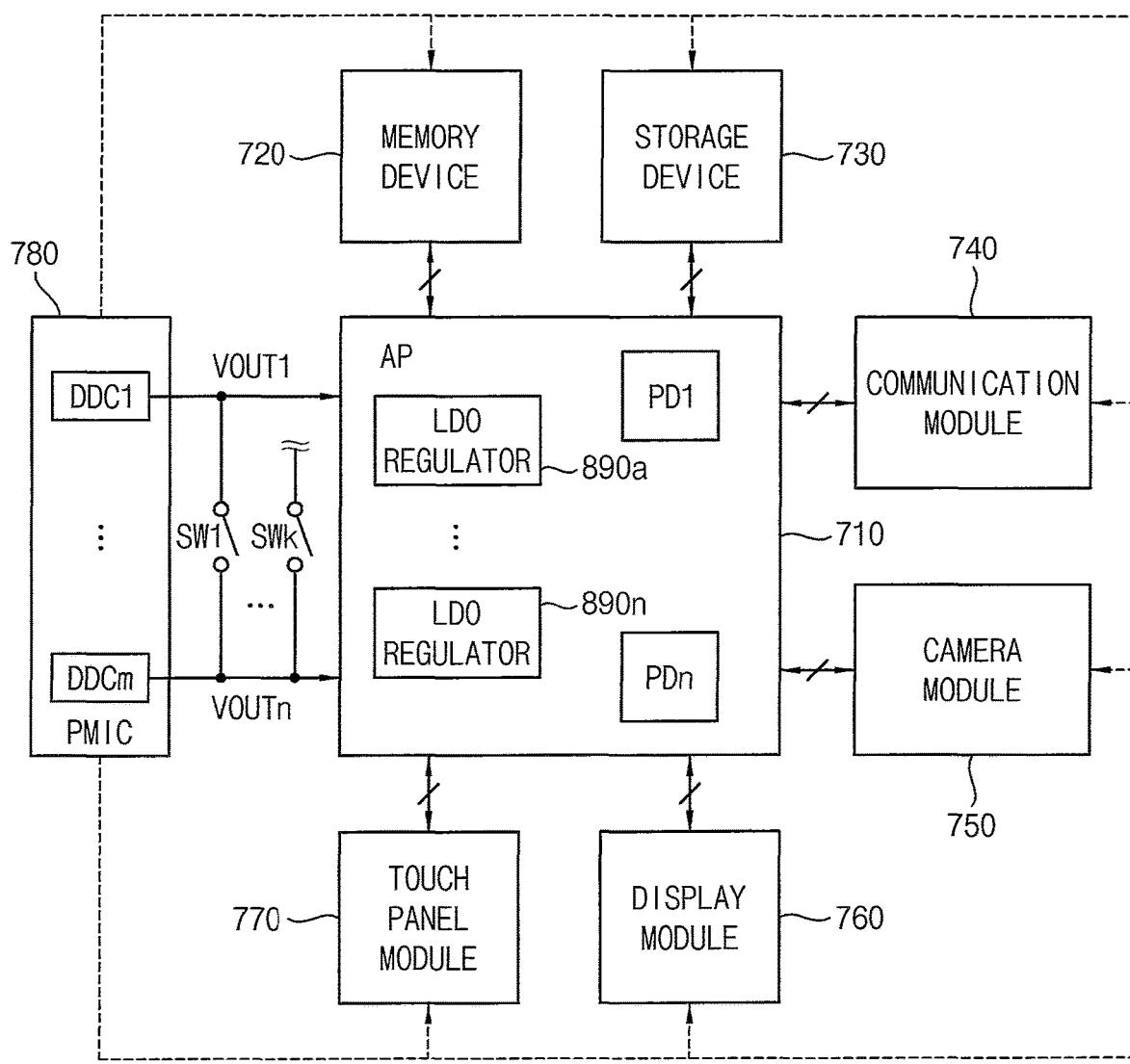
FIG. 19 is a block diagram illustrating a mobile device according to example embodiments.

FIG. 19 is a block diagram illustrating a mobile device according to example embodiments.

Referring to FIG. 19, a mobile device 700 may include a SoC 710 and a PMIC. In some example embodiments, the mobile device 700 may further include a plurality of devices or modules 720, 730, 740, 750, 760 and 770, such as a memory device 720, a storage device 730, a communication module 740, a camera module 750, a display module 760, a touch panel module 770, etc. For example, the mobile device 700 may be implemented as a smart-phone. The mobile device 700 may further include a plurality of switches SW1~SWk, where k is an integer greater than two.

The SoC 710 may control overall operations of the mobile device 700. For example, the SoC 710 may control the memory device 720, the storage device 730 and the plurality of modules 740, 750, 760 and 770. In example embodiments, the SoC 710 may be an application processor (AP) included in the mobile device 700.

The SoC 710 may correspond to one of the 100, 100*a*, 100*b* and 100*c* in FIGS. 2A, 5, 10 and 12, and may receive output voltages VOUT1~VOUTn from the PMIC 780. The SoC 710 may include a plurality of power domains PD1~PDn, and each of the plurality of power domains PD1~PDn may include at least one function block. Each of the LDO regulators 890*a*~890*n* may be dedicated to respective one of the power domains PD1~PDn.

As described with reference to FIGS. 5 and 9, at least some of the output voltages VOUT1~VOUT are shared by the switches SW1~SWk and the shared output voltage may be provided to corresponding power domains from among the power domains PD1~PDn.

The memory device 720 and the storage device 730 may store data for operations of the mobile device 700. The memory device 720 may include a volatile memory device, such as a dynamic random access memory (DRAM), a SRAM, a mobile DRAM, etc. The storage device 730 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In example embodiments, the storage device 830 may further include a solid state drive (SSD), a hard disk drive (HDD), a CD-ROM, etc.

The plurality of modules 740, 750, 760 and 770 may perform various functions of the mobile device 700. For example, the mobile device 700 may include the communication module 740 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), the camera module 750 that performs a camera function, the display module 760 that performs a display function, the touch panel module 770 that performs a touch sensing function, etc. In example embodiments, the mobile device 700 may further include a global positioning system (GPS) module, a microphone (MIC) module, a speaker module, a gyroscope module, etc.

Figure 20:
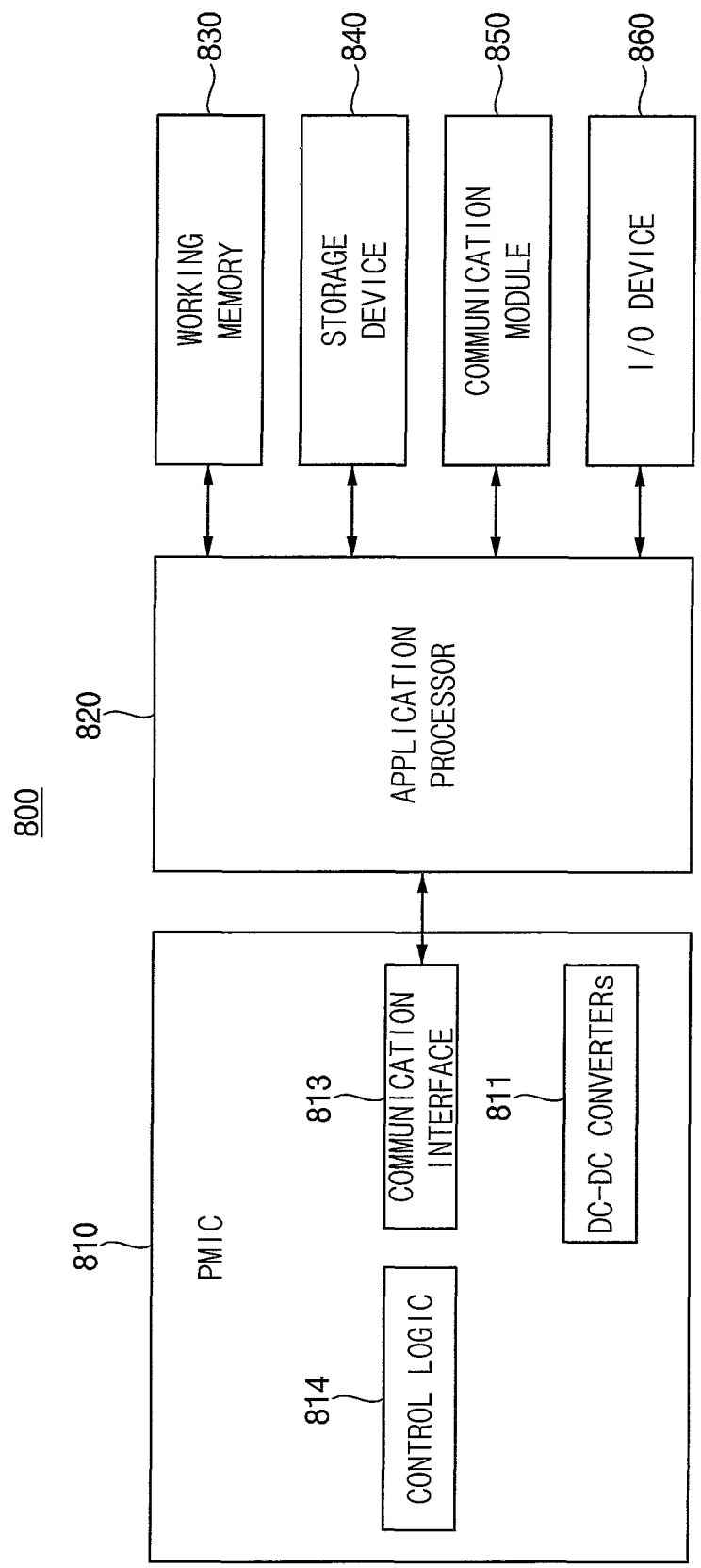
FIG. 20 is a block diagram illustrating a computing system according to example embodiments.

FIG. 20 is a block diagram illustrating a computing system according to example embodiments.

Referring to FIG. 20, a computing system 800 may be implemented with an electronic device capable of using or supporting an interface protocol proposed by the mobile industry processor interface (MIPI) alliance. The computing system 800 may include an application processor 820, a working memory 830, a storage device 840, a communication module 850, an I/O device 860 and a PMIC 810.

The application processor 820 may control the components 810, 830, 840, 850 and 860.

The working memory 830 may temporarily store data processed or to be processed by the application processor 820. The storage device 840 may semi-permanently store data processed or to be processed by the application processor 820.

The communication module 850 may communicate with an external device based on various communication protocols such as world interoperability for microwave access (Wimax), wireless local area network (WLAN), ultra wideband (UWB), long term evolution (LTE), global system for mobile communications (GSM), code division multiple access (CDMA), Bluetooth, near field communication (NFC), wireless fidelity (Wi-Fi), radio frequency identification (RFID), transfer control protocol/Internet protocol (TCP/IP), USB, SCSI, mobile PCIe (M-PCIe), and Firewire. The I/O device 860 may include a keyboard, a mouse, a key pad, a button, a touch panel, a touchscreen, a touch pad, a touch ball, a microphone, a gyroscope sensor, a vibration sensor, a liquid crystal display (LCD) device, a light-emitting diode (LED) display device, an organic LED (OLED) display device, an active matrix OLED (AMO-LED) display device, a speaker, a motor, an image sensor, a depth sensor, a camera, a display, an antenna, and so on.

The PMIC 810 may include DC-DC converters 811, a communication interface 813 and a control logic 814. Each of the DC-DC converters 811 may provide a corresponding output voltage to respective one of the components 810, 830, 840, 850 and 860. The control logic 814 mat designate a DC-DC converter which provides an output voltage (i.e., a target output voltage) having a target voltage level corresponding to a smallest voltage level, from among the DC-DC converters 811, as a global DC-DC converter based on a DVFS performed in the application processor 820, may provide the target output voltage to a power domain corresponding the global DC-DC converter and to at least one first power domain consuming the target output voltage, from among a plurality of power domains such that the target output voltage provided from the global DC-DC converter is shared with the at least one first power domain.

Therefore, the computing system 800, in a low power scenario, enables one of the DC-DC converters 811 which generate the target output voltage, and the enabled DC-DC converter provides the target output voltage to corresponding power domains by sharing the target output voltage. Therefore, the computing system 800 may enhance efficiency in the low power scenario.

The present disclosure may be applied to a PMIC, an SoC, and various devices and systems including the PMIC and the SoC, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, a wearable device, an IoT device, an IoE device, an e-book, a VR device, an AR device, a robotic device, etc.

According to one or more example embodiments, the electronic device in a low power scenario, enables one of the DC-DC converters which generate the target output voltage, and the enabled DC-DC converter provides the target output voltage to corresponding power domains by sharing the target output voltage. Therefore, the electronic device may enhance efficiency in the low power scenario.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. An electronic device comprising:
a system-on chip (SoC) including a plurality of power domains and a dynamic voltage and frequency scaling (DVFS) controller configured to perform DVFS on the plurality of power domains, each of the plurality of power domains including at least one function block; and
a power management integrated circuit (PMIC) including a plurality of direct current (DC)-DC converters and a control logic configured to control the plurality of DC-DC converters, each of the plurality of DC-DC converters configured to provide a corresponding one of a plurality of output voltages to a respective one of the plurality of power domains,
wherein the control logic is configured to:
designate a target DC-DC converter configured to provide a target output voltage having a target level, from among the plurality of DC-DC converters, as a global DC-DC converter based on a power management control signal associated with the DVFS; and
provide the target output voltage to a power domain corresponding to the global DC-DC converter and to at least one first power domain consuming the target output voltage, from among the plurality of power domains, by sharing the target output voltage provided by the global DC-DC converter.

2. The electronic device of claim 1, further comprising:
a plurality of inductors, each of the plurality of inductors being connected between a respective one of a plurality of output nodes and a respective one of a plurality of switching terminals connected to a respective switching node of a respective one of the plurality of DC-DC converters, a respective one of the plurality of output voltages being provided at a respective one of the plurality of output nodes;
a plurality of output capacitors, each of the plurality of output capacitors being coupled between a respective one of the plurality of output nodes and a ground node; and
a plurality of merging switches configured to connect two different feedback lines from among a plurality of feedback lines, each of the plurality of merging switches connected between a respective one of the plurality of output nodes and a respective one of the plurality of DC-DC converters.

3. The electronic device of claim 2, wherein the control logic is further configured to:

disable at least one first DC-DC converter that provides the target output voltage to the at least one first power domain from among the plurality of DC-DC converters;
share the target output voltage by turning on a first merging switch, from among the plurality of merging switches, to connect a first feedback line of the global DC-DC converter with a second feedback line of the at least one first DC-DC converter; and
turn off a second merging switch, from among the plurality of merging switches, to connect the first feedback line of the global DC-DC converter with a feedback line of at least one second DC-DC converter,
wherein the at least one second DC-DC converter is configured to provide a first output voltage having a voltage level that is greater than the target level.

4. The electronic device of claim 3, wherein, in response to the at least one second DC-DC converter providing the target output voltage to at least one second power domain from among the plurality of power domains, the control logic is configured to:
turn on the second merging switch; and
disable the at least one second DC-DC converter.

5. The electronic device of claim 4, wherein, in response to the DVFS controller performing the DVFS such that the at least one first power domain and the at least one second power domain consume a second output voltage greater than the target level, the control logic is configured:
enable the at least one first DC-DC converter and the at least one second DC-DC converter;
turn off the second merging switch; and
turn off the first merging switch.

6. The electronic device of claim 1, further comprising:
a plurality of inductors, each of the plurality of inductors being connected between a respective one of a plurality of output nodes and a respective one of a plurality of switching terminals connected to a respective switching node of a respective one of the plurality of DC-DC converters, a respective one of the plurality of output voltages being provided at a respective one of the plurality of output nodes;
a plurality of output capacitors, each of the plurality of output capacitors being coupled between a respective one of the plurality of output nodes and a ground node;
a plurality of first connection switches, each of the plurality of first connection switches being connected between each of a plurality of switching nodes and a respective one of the plurality of switching terminals;
a plurality of second connection switches, each of the plurality of second connection switches being connected between each of a plurality of feedback nodes and a respective one of the plurality of DC-DC converters, each of the plurality of feedback nodes being connected to a respective one of a plurality of feedback lines connected to the plurality of output nodes; and
a plurality of merging switches configured to connect two different feedback lines among the plurality of feedback lines.

7. The electronic device of claim 6, wherein the control logic is further configured to:
disable at least one first DC-DC converter that provides the target output voltage to the at least one first power domain, from among the plurality of DC-DC converters;
turn off a first connection switch from among the plurality of first connection switches and to turn off a second connection switch from among the plurality of second connection switches, the first connection switch and the second connection switch being associated with the at least one first DC-DC converter;

share the target output voltage by turning on a first merging switch to connect a first feedback line of the global DC-DC converter with a second feedback line of the at least one first DC-DC converter, from among the plurality of merging switches; and turn off a second merging switch to connect the first feedback line of the global DC-DC converter with a third feedback line of at least one second DC-DC converter, from among the plurality of merging switches, wherein the at least one second DC-DC converter provides a first output voltage having a voltage level that is greater than the target level.

8. The electronic device of claim 7, wherein, in response to the at least one second DC-DC converter providing the target output voltage to at least one second power domain from among the plurality of power domains, the control logic is further configured to:

turn off a third connection switch from among the plurality of first connection switches and to turn off a fourth connection switch from among the plurality of second connection switches, the third connection switch and the fourth connection switch being associated with the at least one second DC-DC converter;

turn on the second merging switch; and disable the at least one second DC-DC converter.

9. The electronic device of claim 7, wherein, in response to the at least one second DC-DC converter providing the target output voltage to at least one second power domain from among the plurality of power domains, the control logic is further configured to:

turn off a third connection switch from among the plurality of first connection switches and to turn off a fourth connection switch from among the plurality of second connection switches, the third connection switch and the fourth connection switch being associated with the at least one second DC-DC converter; and turn on the second merging switch, and wherein, in response to the DVFS controller performing the DVFS such that the at least one first power domain and the at least one second power domain consume a second output voltage greater than the target level, the control logic is further configured to:

enable the at least one first DC-DC converter and the at least one second DC-DC converter;

turn on the first connection switch and the second connection switch;

turn off the second merging switch; and turn on the third connection switch and the fourth connection switch; and turn off the first merging switch.

10. The electronic device of claim 1, further comprising:

a plurality of inductors, each of the plurality of inductors being connected between respective one of a plurality of output nodes and respective one of a plurality of switching terminals connected to respective switching node of respective one of the plurality of DC-DC converters, a respective one of the plurality of output voltages being provided at respective one of the plurality of output nodes;

a plurality of output capacitors, each of the plurality of output capacitors being coupled between respective one of the plurality of output nodes and a ground voltage; and a plurality of multiplexers configured to receive the plurality of output voltages, wherein each of the plurality of multiplexers is configured to select one of the plurality of output voltages in response to respective one of a plurality of selection signals to provide the selected one of the plurality of output voltages to a respective one of the plurality of power domains.

11. The electronic device of claim 10, wherein the plurality of multiplexers are disposed between the PMIC and the SoC, and wherein the SoC further includes a selection signal generator configured to generate the plurality of selection signals based on control of the DVFS controller and to provide a respective one of the plurality of selection signals to a respective one of the plurality of multiplexers via a general purpose input/output (GPIO) terminal.

12. The electronic device of claim 10, wherein the plurality of multiplexers are included in the SoC.

13. The electronic device of claim 12, wherein the SoC further includes a selection signal generator configured to generate the plurality of selection signals based on control of the DVFS controller and to provide a respective one of the plurality of selection signals to a respective one of the plurality of multiplexers.

14. The electronic device of claim 1, wherein each of the plurality of DC-DC converters includes:

a first power transistor connected between an input voltage and a switching node coupled to a switching terminal;

a second power transistor connected between the switching node and a ground voltage;

a pulse-width modulation (PWM) signal generator configured to generate a PWM signal based on a feedback voltage having a voltage level proportional to a corresponding one of the plurality of output voltages; and a main driver configured to generate a first driving control signal to drive the first power transistor and a second driving control signal to drive the second power transistor based on the PWM signal such that the first driving control signal and the second driving control signal have a non-overlapped activation interval with respect to each other.

15. The electronic device of claim 1, wherein the SoC further includes a power management unit configured to monitor power consumption of the SoC and configured to generate the power management control signal based on a power control signal from the DVFS controller.

16. A method of controlling power in an electronic device, wherein the electronic device includes a system on chip (SoC) including a plurality of power domains and a dynamic voltage and frequency scaling (DVFS) controller configured to perform DVFS on the plurality of power domains, each of the plurality of power domains including at least one function block, and a power management integrated circuit (PMIC) including a plurality of direct current (DC)-DC converters, the method comprising:

providing, by each of the plurality of DC-DC converters, a corresponding one of a plurality of output voltages to a respective one of the plurality of power domains;

designating a target DC-DC converter configured to provide a target output voltage having a target level, from among the plurality of DC-DC converters, as a global DC-DC converter based on the DVFS; and providing the target output voltage to a power domain corresponding to the global DC-DC converter and at least one first power domain consuming the target output voltage, from among the plurality of power domains, by sharing the target output voltage provided by the global DC-DC converter.

17. The method of claim 16, wherein the sharing the target output voltage provided by the global DC-DC converter includes:
controlling a plurality of merging switches configured to connect two different feedback lines from among a plurality of feedback lines of the plurality of DC-DC converters, and
wherein each of the plurality of feedback lines is connected to a respective one of a plurality of output nodes providing the plurality of output voltages.

18. The method of claim 16, wherein the sharing the target output voltage provided by the global DC-DC converter includes:
controlling a plurality of multiplexers disposed between the PMIC and the SoC, and
wherein the plurality of multiplexers are configured to receive the plurality of output voltages.

19. The method of claim 16, wherein the sharing the target output voltage provided by the global DC-DC converter includes:
controlling a plurality of multiplexers are disposed inside of the SoC, and
wherein the plurality of multiplexers are configured to receive the plurality of output voltages.

20. An electronic device comprising:
a system on chip (SoC) including a plurality of power domains and a dynamic voltage and frequency scaling (DVFS) controller configured to perform DVFS on the plurality of power domains, each of the plurality of power domains including at least one function block;
a power management integrated circuit (PMIC) including a plurality of direct current (DC)-DC converters and a control logic configured to control the plurality of DC-DC converters, each of the plurality of DC-DC converters configured to provide a corresponding one of a plurality of output voltages to a respective one of the plurality of power domains;
a plurality of inductors, each of the plurality of inductors being connected between a respective one of a plurality of output nodes and a respective one of a plurality of switching terminals connected to respective switching node of a respective one of the plurality of DC-DC converters, a respective one of the plurality of output voltages being provided at respective one of the plurality of output nodes;
a plurality of output capacitors, each of the plurality of output capacitors being coupled between respective one of the plurality of output nodes and a ground voltage;
a plurality of first connection switches, each of the plurality of first connection switches being connected between each of a plurality of switching nodes and a respective one of the plurality of switching terminals;
a plurality of second connection switches, each of the plurality of second connection switches being connected between each of a plurality of feedback nodes and a respective one of the plurality of DC-DC converters, each of the plurality of feedback nodes being connected to a respective one of a plurality of feedback lines connected to the plurality of output nodes; and
a plurality of merging switches configured to connect two different feedback lines among the plurality of feedback lines,
wherein the control logic is further configured to:
designate a target DC-DC converter configured to provide a target output voltage having a target level among the plurality of DC-DC converters as a global DC-DC converter based on a power management control signal associated with the DVFS, and
provide the target output voltage to a power domain corresponding the global DC-DC converter and to at least one first power domain consuming the target output voltage among the plurality of power domains by controlling the plurality of first connection switches, the plurality of second connection switches and the plurality of merging switches to share the target output voltage provided by the global DC-DC converter.

* * * * *